United States Patent
Bassi et al.

(10) Patent No.: US 10,965,221 B1
(45) Date of Patent: Mar. 30, 2021

(54) SWITCHED CAPACITOR BASED BOOST INVERTER TOPOLOGY WITH A HIGHER NUMBER OF LEVELS AND HIGHER VOLTAGE GAIN

(71) Applicant: King Abdulaziz University, Jeddah (SA)

(72) Inventors: Hussain Bassi, Jeddah (SA); Muhyaddin Rawa, Jeddah (SA); Saad Mekhilef, Jeddah (SA); Marif Daula Siddique, Jeddah (SA); Noraisyah Binti Mohamed Shah, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/008,760

(22) Filed: Sep. 1, 2020

(51) Int. Cl.
*H02M 7/483* (2007.01)
*H02M 7/5387* (2007.01)

(52) U.S. Cl.
CPC ....... *H02M 7/53871* (2013.01); *H02M 7/483* (2013.01)

(58) Field of Classification Search
CPC .... H02M 7/483; H02M 7/53871; H02M 7/44; H02M 7/53; H02M 2007/4835
See application file for complete search history.

(56) References Cited

U.S. PATENT DOCUMENTS 7,639,515 B2 * 12/2009 Ponnaluri ............. H02M 7/487
363/131

9,331,599 B2 * 5/2016 Al-Haddad ........... H02M 7/483
2016/0126862 A1 5/2016 Vahedi et al.

FOREIGN PATENT DOCUMENTS

WO  WO-2020047677 A1 * 3/2020 .......... H02M 7/5395

OTHER PUBLICATIONS

M. Jagabar Sathik, et al. "Compact Switched Capacitor Multilevel Inverter (CSCMLI) With Self Voltage Balancing and Boosting Ability", IEEE Transactions on Power Electronics, 2018, 5 pages.
Marif Daula Siddique, et al., "A New Single Phase Single Switched-Capacitor Based Nine-Level Boost Inverter Topology with Reduced Switch Count and Voltage Stress", IEEE Access, 2017, 10 pages.
Marif Daula Siddique, et al., "A Single DC Source Nine-Level Switched-Capacitor Boost Inverter Topology with Reduced Switch Count", IEEE Access, 2017, 10 pages.
(Continued)

*Primary Examiner* — Gary L Laxton
(74) *Attorney, Agent, or Firm* — Oblon, McClelland, Maier & Neustadt, L.L.P.

(57) ABSTRACT

A multi-level switched capacitor boost inverter includes a series connection of a two-switched capacitor circuit, a source module and at least one one-switched capacitor circuit. Level-shifted pulse width modulation is used to apply gate pulses to the switches. The multi-level switched capacitor boost inverter uses only three capacitors and a single DC voltage source to generate thirteen voltage levels at load terminals with a voltage gain of three. The capacitors of the two-switched capacitor circuit are self-balancing. Additional one-switched capacitor circuits can be added in series with the inverter. Each additional one-switched capacitor circuit increases the number of levels and increases the gain by one.

20 Claims, 20 Drawing Sheets

(56) References Cited

OTHER PUBLICATIONS

Sze Sing Lee, "A Single-Phase Single-Source 7-Level Inverter With Triple Voltage Boosting Gain", IEEE Access, vol. 6, May 31, 2018, pp. 30005-30011.
"ON Semiconductor FGHL50T65SQDT IGBT", Mouser Electronics, https://www.mouser.com/new/on-semiconductor/on-semi-fghl50t65sqdt-igbt/, Jun. 16, 2020, 2 pages.

* cited by examiner

SWITCHED CAPACITOR BASED BOOST INVERTER TOPOLOGY WITH A HIGHER NUMBER OF LEVELS AND HIGHER VOLTAGE GAIN

BACKGROUND

Technical Field

The present disclosure is directed to a system and an apparatus for a multi-level switched capacitor boost inverter which can generate at least thirteen voltage levels with high voltage gain using a single DC voltage source and related methods of use. Additional switched capacitor units may be added in series to achieve higher voltage levels and higher voltage gains.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Multilevel inverters are power converters which generate a staircase output voltage by an arrangement of power semiconductor devices, such as switches and/or power diodes, with dc voltage links to dc voltage sources or capacitors. A multilevel inverter (MLI) can synthesize higher output voltage waveforms using much lower rated switches. With a higher number of levels, the output voltage waveform comes close to the sinusoidal waveform, thus improving its total harmonic distortion. Consequently, the inverter reduces filter requirements. In addition, a multilevel inverter offers advantages such as lower voltage stress across switches, improved efficiency, reduced dv/dt stress, and lower electromagnetic interference.

Multilevel boost inverters have application in power electronics fields, such as electric vehicle rechargeable batteries and solar power converters. However, the high number of switching components and the use of many DC voltage sources increases the costs and drains the system of energy.

A switched capacitor multilevel boost inverter capable of generating nine levels of output voltage using nine unidirectional switches, a single DC voltage source, two DC link capacitors and one switched capacitor has been described. (See Siddique, M., Mekhilef, Saad, Shah, N., Ali, J., Meraj, M, Iqbal, A, Al-Hitmi, M., "A new single phase single switched-capacitor based nine-level boost inverter topology with reduced switch count and voltage stress", November 2019; IEEE Access 7, https://www.researchgate.net/publication/337649304_A_New_Single_Phase_Single_Switched-Capacitor_Based_Nine_Level_Boost_Inverter_Topology_With_Reduced_Switch_Count_and_Voltage_Stress, incorporated herein by reference in its entirety).

A switched capacitor multilevel boost inverter which is capable of producing nine levels of output voltage using a single DC source and two DC link capacitors has been described. (See Siddique, M.; Mekhilef, Saad; Shah, N.; Sandeep; Ali, J.; Iqbal, A.; Ahmed, M.; Ghoneim, S.; Al-Harthi, M.; Alamri, B.; Salem, F.; "A single DC source nine-level switched-capacitor boost inverter topology with reduced switch count", December 2019; IEEE Access; https://www.researchgate.net/publication/338159472_A_Single_DC_Source_Nine-Level_Switched-Capacitor_Boost_Inverter_Topology_with_Reduced_Switch_Count, incorporated herein by reference in its entirety).

However, a switched capacitor multilevel boost inverter capable of generating greater than nine levels of output voltage using a reduced number of components is necessary to meet the needs of power electronics applications while saving energy and increasing reliability.

Accordingly, it is one object of the present disclosure to provide an apparatus and methods for a multi-level switched capacitor boost inverter which generates at least thirteen voltage levels and high voltage gain using a single DC voltage source.

SUMMARY

In an exemplary embodiment, a multi-level switched capacitor boost inverter is described, comprising a two-switched capacitor circuit including a first capacitor, a second capacitor and a first plurality of switches, $S_L$, a first one-switched capacitor circuit including a third capacitor and a second plurality of switches, $S_R$, a source circuit including a DC voltage source and a third plurality of switches, $S_S$, the source circuit connected in series between the first switched capacitor circuit and the second switched capacitor circuit, a pair of load terminals, and a control circuit operatively connected to the DC voltage source, the first, second and third capacitors and the first, second and third plurality of switches, wherein the control circuit is configured to selectively operate the first, second and third plurality of switches to balance the first and second capacitors and provide an output voltage across the pair of load terminals.

In another exemplary embodiment, a method of operating a multi-level switched capacitor boost inverter is described, comprising generating, by a control circuit, a plurality of gate pulses using level-shifted pulse width modulation (LS-PWM), applying the gate pulses to a plurality of unidirectional semiconductor switches of the multi-level switched capacitor boost inverter, charging, by a DC voltage source, a pair of series connected capacitors of a two-switched capacitor circuit of the multi-level switched capacitor boost inverter, adjusting the gate pulses to balance each of the series connected capacitors to have a same voltage magnitude, charging, by the DC voltage source of a source circuit of multi-level switched capacitor boost inverter, a first output capacitor of a first one-switched capacitor circuit of the multi-level switched capacitor boost inverter, and generating a thirteen-level output voltage across a pair of load terminals equal to the charge on the first output capacitor.

In another exemplary embodiment, a method of providing a multi-level switched capacitor boost inverter is described, comprising connecting a two-switched capacitor circuit, a source circuit and at least one first one-switched capacitor circuit in series, connecting a load across the two-switched capacitor circuit and the at least one first one-switched capacitor circuit, operatively connecting a control circuit to each gate of a plurality of switches of the two-switched capacitor circuit, the source circuit and the at least one first one-switched capacitor circuit, the capacitors and across the load, generating, by the control circuit, a plurality of gate pulses using level-shifted pulse width modulation, applying the gate pulses to the plurality of switches, charging, with a DC voltage source, a pair of series connected capacitors of the two-switched capacitor circuit, adjusting the gate pulses to balance each of the series connected capacitors to have a same voltage magnitude, charging, by the DC voltage source of a source circuit of the multi-level switched capacitor boost inverter, an output capacitor of the one-switched capacitor circuit, and generating an output voltage across the load equal to the charge on the output capacitor, wherein the output voltage has thirteen voltage levels and a gain equal to three.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
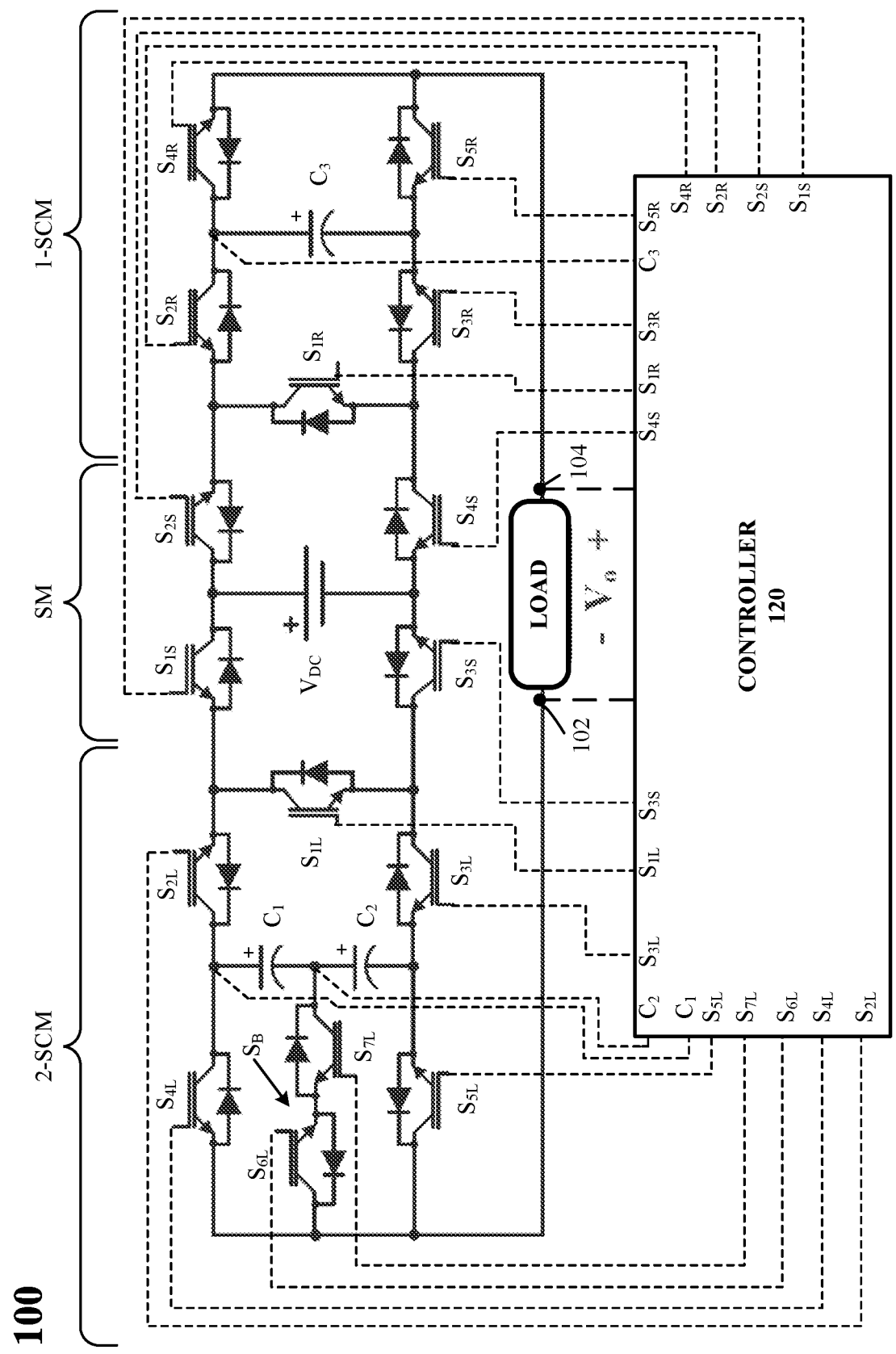
FIG. 1A is a circuit diagram illustrating the basic unit of the boost inverter.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a multi-level switched capacitor boost inverter, a method of operating a multi-level switched capacitor boost inverter and a method of providing a multi-level switched capacitor boost inverter.

Aspects of the present disclosure describe a multi-level switched capacitor boost inverter topology using a single DC voltage source. Aspects of the present disclosure describe a thirteen level switched capacitor boost inverter topology using a single DC voltage source and sixteen switching components. The advantages of the thirteen level boost inverter topology include the following:

(i). Single-state boost inverter topology.

(ii). The basic unit (100, FIG. 1A) is able to generate thirteen levels across a load with one switched capacitor.

(iii). Higher voltage gain is attained than for conventional boost inverters. For the basic unit shown in FIG. 1A, the voltage gain is three.

(iv). Integrated polarity reversal capability.

(v). The maximum voltage stress across any switch is equal to the input DC voltage source.

(vi). Self-balancing of capacitor voltages.

(vii). Higher numbers of levels can be achieved by adding switched capacitor modules without the need for cascade connections.

A single-phase boost inverter unit 100 is depicted in FIG. 1A. The basic unit includes three circuit modules: a source module (SM), a two switched capacitors circuit module (2-SCM), and a one switched capacitor circuit module (1-SCM). A controller 120 is connected across the load terminals to monitor the load voltage. The controller is connected at individual outputs (indicated by dotted lines) to the gate contacts of each switch. The controller may also monitor the capacitor voltages and adjust the circuit parameters to balance the capacitors. The controller may include a processor, such as a microprocessor or microcontroller, connected to memory, such as RAM, ROM, EEPROM, and/or FLASH, and connected to interface circuitry in order to control the switching elements. The controller 120 may also include specialized circuits implemented on, for example, a field programmable gate array (FPGA) and/or an application specific integrated circuit (ASIC) in order to effect control of the switching elements. The controller 120 may also include discrete circuit components (transistors, capacitors, resistors, logic gats, etc.) in order to implement the control functionality. Portions of the functionality of the controller 120 may also be implemented as software stored in the aforementioned memory and executing on the aforementioned processor. The controller may also be co-located with the other circuits in the multilevel inverter or may be located remotely. As such, the specific implementation of the controller 120 is not limiting upon the advancements described in the present disclosure.

The switching elements of FIG. 1A-FIG. 3 may be transistors, such as bipolar transistors, insulated gate bipolar transistors (IGBTs), junction field effect transistors (JFETs), metal oxide field effect transistors (MOSFETs), or thyristors. Preferably the switches are insulated gate bipolar transistors (IGBTs). Each IGBT is antiparallel to a Zener diode.

Figure 1B:
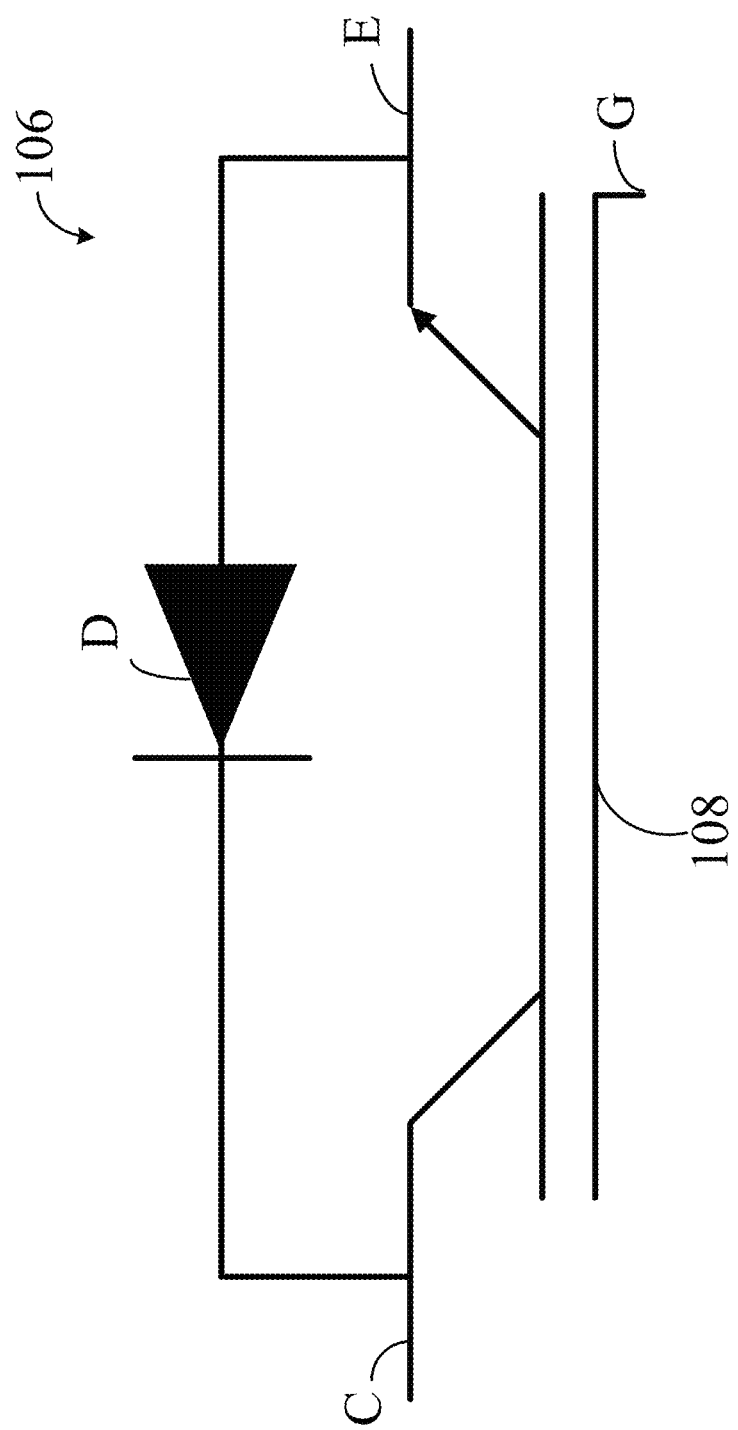
FIG. 1B is an exemplary switching element.

FIG. 1B illustrates a switching element 106 including an IGBT transistor 108 and an antiparallel Zener diode, D. The IGBT transistor has a collector, C, an emitter, E and a gate contact. The Zener diode is connected between the collector and emitter so that the flow of current through the Zener diode (from the emitter to the collector) is antiparallel to the flow of current in the transistor from the collector to the emitter.

An insulated-gate bipolar transistor (IGBT) is a three-terminal power semiconductor device primarily used as an electronic switch which combines high efficiency and fast switching. It consists of four alternating layers (P-N-P-N) that are controlled by a metal-oxide-semiconductor (MOS) gate structure. In a non-limiting example, an IGBT with an antiparallel diode may be an FGHL50T65SQDT IGBT available from Mouser Electronics, 1000 North Main Street, Mansfield, Tex., U.S.A.

(i) The Source Module (SM) consists of an input DC voltage source ($V_{dc}$) with four unidirectional switches $S_{1S}$-$S_{4S}$. The input DC voltage source may be a photovoltaic (PV) module or a battery. Apart from delivering the energy to the load, the input DC voltage source is also used for charging capacitors $C_1$, $C_2$ and $C_3$. The source module alone can work as an H-bridge and generate three voltage levels of zero, and $\pm V_{dc}$. The voltage rating of each switch connected to the source module SM is equal to the magnitude of $V_{dc}$.

ii) The two-switched capacitors module (2-SCM) is connected to the left side of the source module (as shown in FIG. 1A) and consists of two switched capacitors, $C_1$ and $C_2$, five unidirectional switches $S_{1L}$-$S_{5L}$ and one bidirectional switch which is a series connection of two unidirectional switches ($S_{6L}$ and $S_{7L}$). All five unidirectional switches ($S_{1L}$-$S_{5L}$) of the 2-SCM must have a voltage rating of $V_{dc}$ and the two switches ($S_6$ and $S_7$) of the bidirectional switch need to block a voltage magnitude of $0.5V_{dc}$. The capacitors $C_1$ and $C_2$ are used to split the DC voltage source into equal halves. Therefore, each capacitor, $C_1$, $C_2$, must have a voltage rating equal to half of the input DC voltage source i.e., $0.5V_{dc}$. The 2-SCM in combination with the SM can produce a nine-level output voltage waveform with a voltage gain of two.

(iii) The one-switched capacitor module (1-SCM) is connected to the right side of SM (as shown in FIG. 1A) and consists of one switched capacitor $C_3$ and five unidirectional switches $S_{1R}$-$S_{5R}$. The capacitor $C_3$ and the switches $S_{1R}$-$S_{5R}$ must have a voltage rating equal to the input DC voltage source i.e., $V_{dc}$. The capacitor is charged through the SM up to the magnitude of the input DC voltage source i.e., $V_{dc}$. The 1-SCM, 2-SCM and SM in combination can produce a thirteen level output voltage waveform with a voltage gain of three.

Table 1 shows the different switching states for the circuit topology of FIG. 1. The capacitors $C_1$ and $C_2$ are charged during the voltage levels of zero, $\pm V_{dc}$, and $\pm 2V_{dc}$. Similarly, the capacitor $C_3$ is charged up to voltage level of $V_{dc}$ during the voltage levels of $\pm V_{dc}$. The different combinations for the generation of 13 level output voltage waveform are given in Table 1.

With the single 1-SCM module of FIG. 1, the circuit topology of the present disclosure can generate a 13 level output voltage waveform with a voltage gain of three. The switching diagrams for the 13 level topology in the positive half-cycle are shown in FIG. 2A-FIG. 2G.

In each of FIG. 2A-FIG. 2G, the switches which are ON are shown in bold. A controller is connected to the switches and monitors the load of the multilevel switched capacitor units in FIG. 2A-FIG. 2G (the controller is not shown in these figures for the sake of clarity).

Figure 2A:
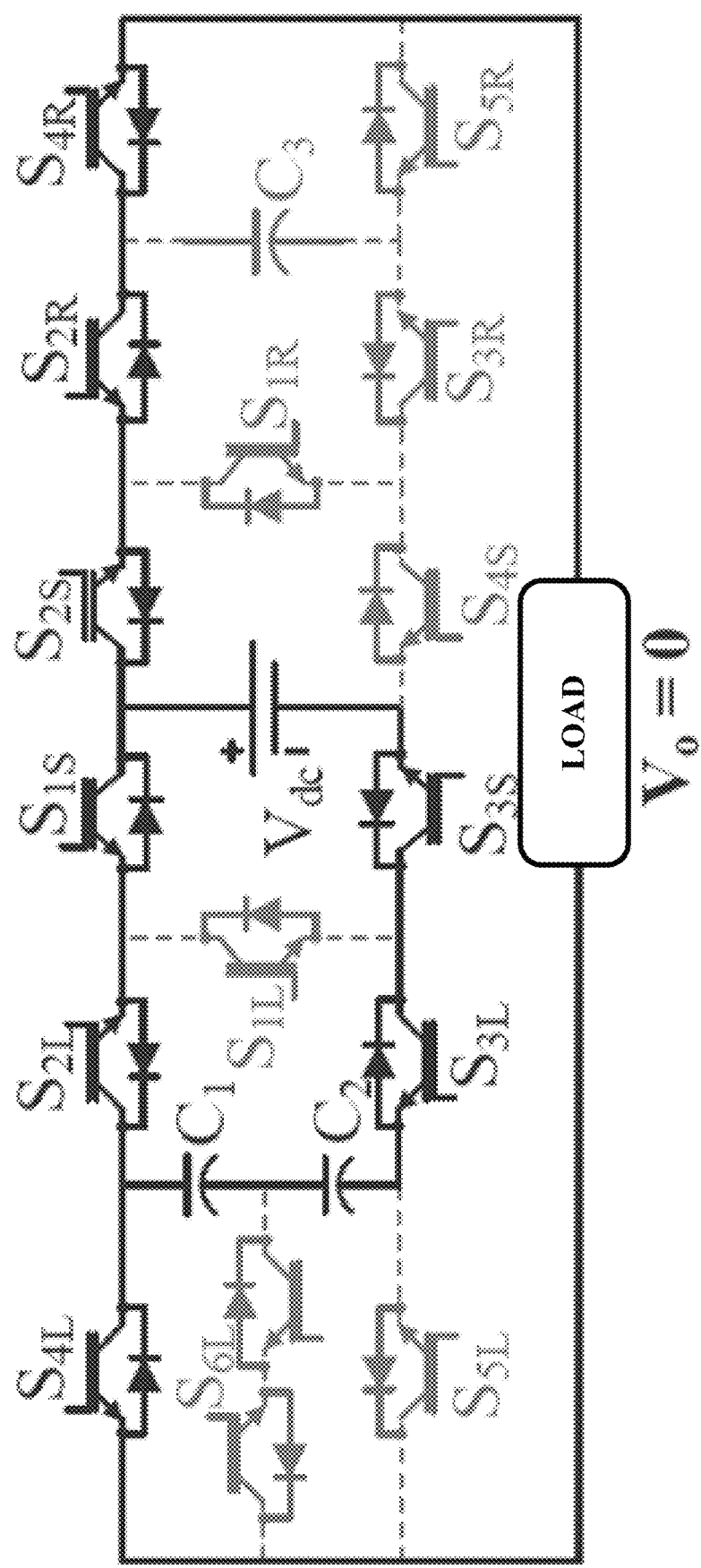
FIGS. 2A-2G are circuit diagrams illustrating the switching states of the 13 level topology during a positive half cycle.

FIG. 2A illustrates the switching arrangement which produces an output (Load) voltage equal to zero. Switches $S_{2L}$, $S_{3L}$, $S_{4L}$, $S_{1S}$, $S_{2S}$, $S_{3S}$, $S_{2R}$ and $S_{4R}$ are in their ON states. Reference to Row 7 of Table 1 shows that the load voltage is zero and that $C_1$ and $C_2$ are charged and $C_3$ does not change state.

Figure 2B:
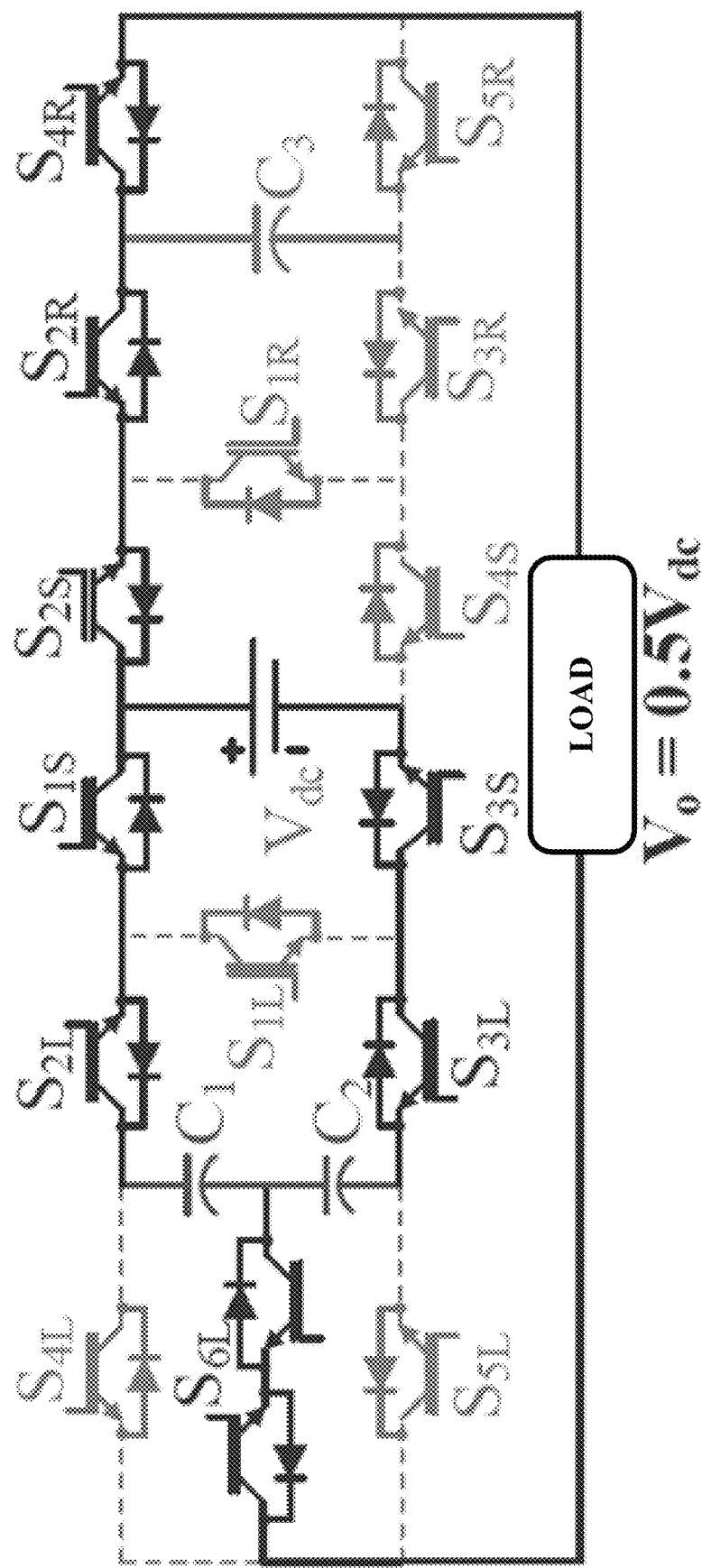

FIG. 2B illustrates the switching arrangement which produces an output (Load) voltage equal to $0.5V_{dc}$. Switches $S_{2L}$, $S_{3L}$, $S_{6L}$, $S_{1S}$, $S_{2S}$, $S_{3S}$, $S_{2R}$ and $S_{4R}$ are in their ON states. Reference to Row 6 of Table 1 shows that the voltage output $V_0$ is $0.5V_{dc}$ and that $C_1$ is discharged and $C_1$ and $C_3$ do not change state.

Figure 2C:
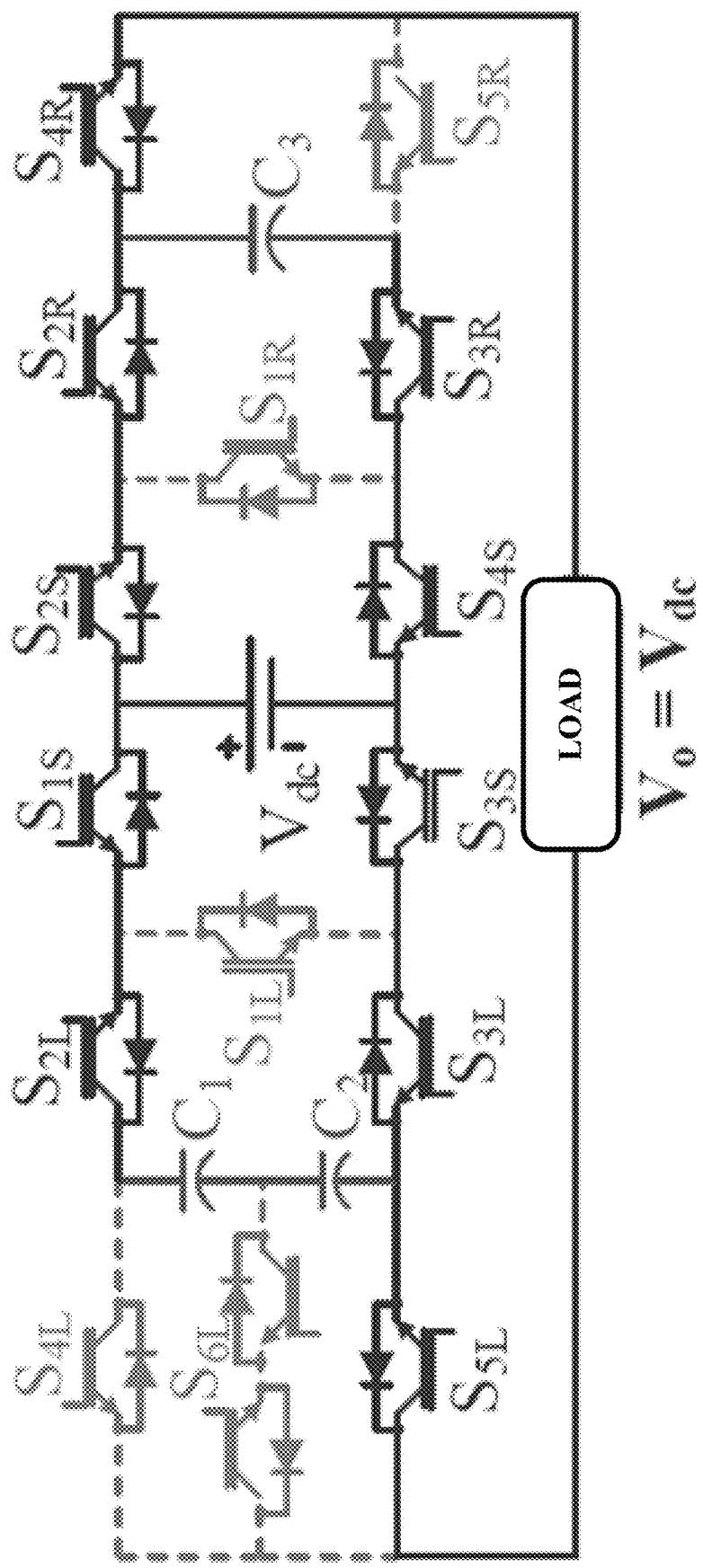

FIG. 2C illustrates the switching arrangement which produces an output (Load) voltage equal to $V_{dc}$. Switches $S_{2L}$, $S_{3L}$, $S_{5L}$, $S_{1S}$, $S_{2S}$, $S_{3S}$, $S_{4S}$, $S_{2R}$, $S_{3R}$ and $S_{4R}$ are in their ON states. Reference to Row 5 of Table 1 shows that the voltage output $V_0$ is $V_{dc}$ and that all three capacitors are charged.

Figure 2D:
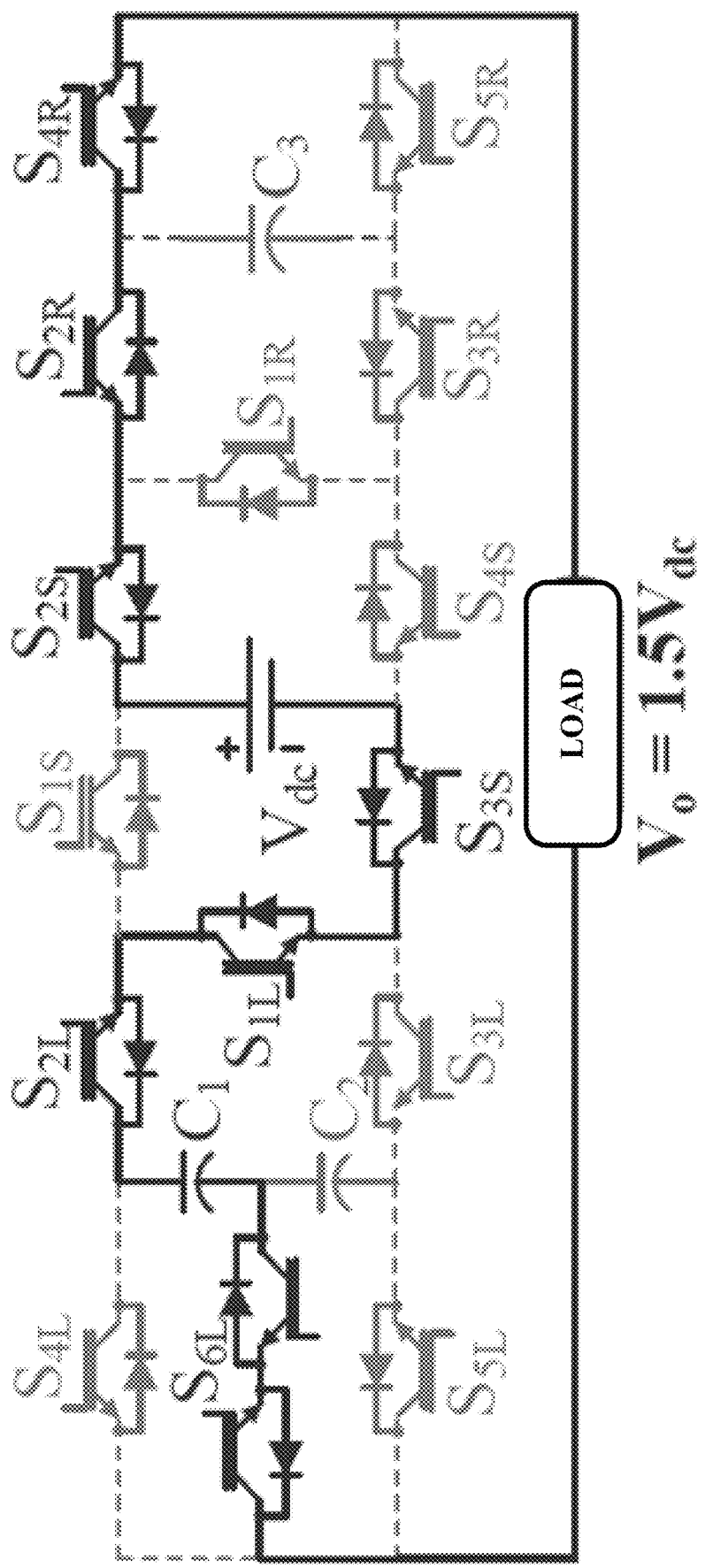

FIG. 2D illustrates the switching arrangement which produces an output (Load) voltage equal to $1.5V_{dc}$. Switches $S_{1L}$, $S_{2L}$, $S_{6L}$, $S_{2S}$, $S_{3S}$, $S_{2R}$ and $S_{4R}$ are in their ON states. Reference to Row 4 of Table 1 shows that the voltage output $V_0$ is $1.5V_{dc}$ and that $C_1$ is discharged and $C_1$ and $C_3$ do not change state.

Figure 2E:
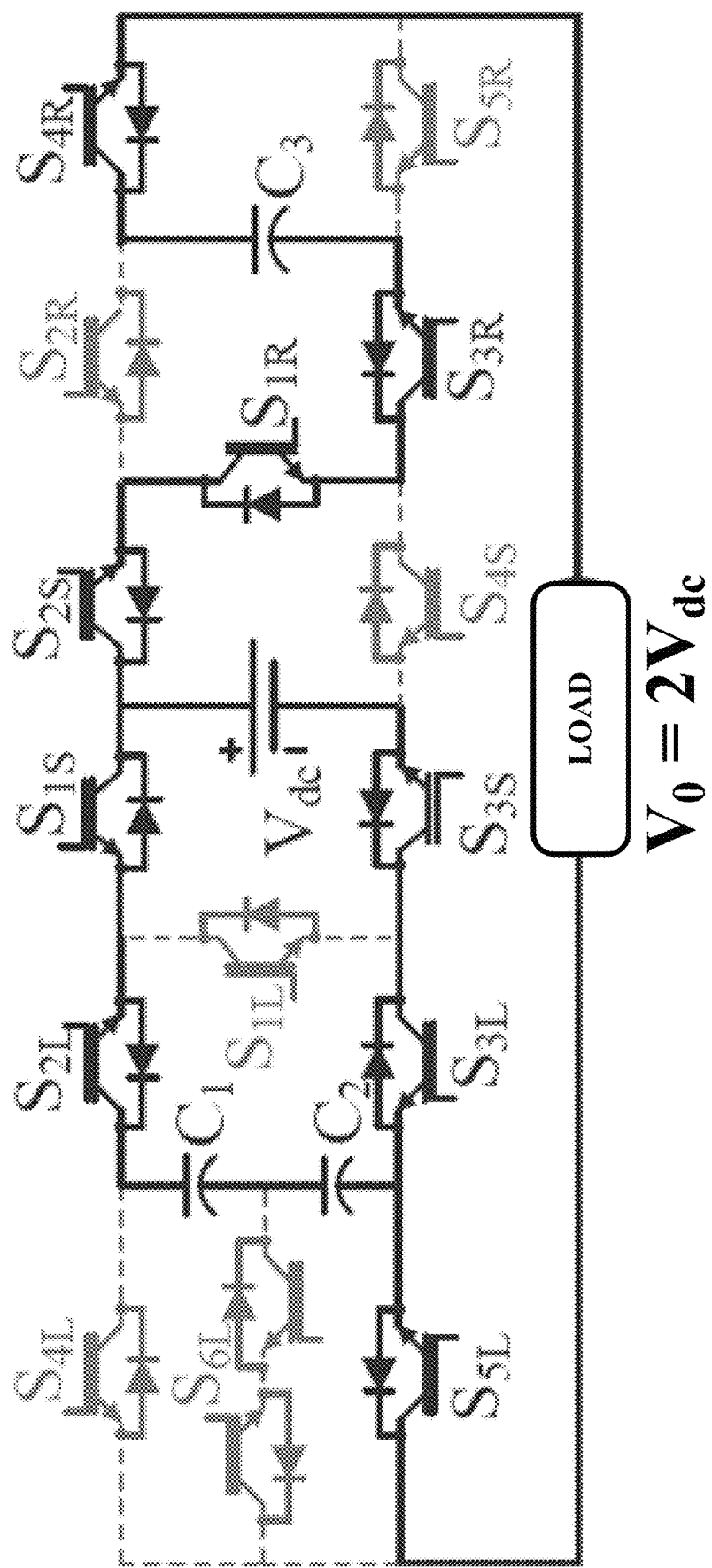

FIG. 2E illustrates the switching arrangement which produces an output (Load) voltage equal to $2V_{dc}$. Switches $S_{2L}$, $S_{3L}$, $S_{5L}$, $S_{1S}$, $S_{2S}$, $S_{3S}$, $S_{1R}$, $S_{3R}$ and $S_{4R}$ are in their ON states. Reference to Row 3 of Table 1 shows that the load voltage is $2V_{dc}$ and that $C_1$ and $C_2$ are charged and $C_3$ is discharged.

Figure 2F:
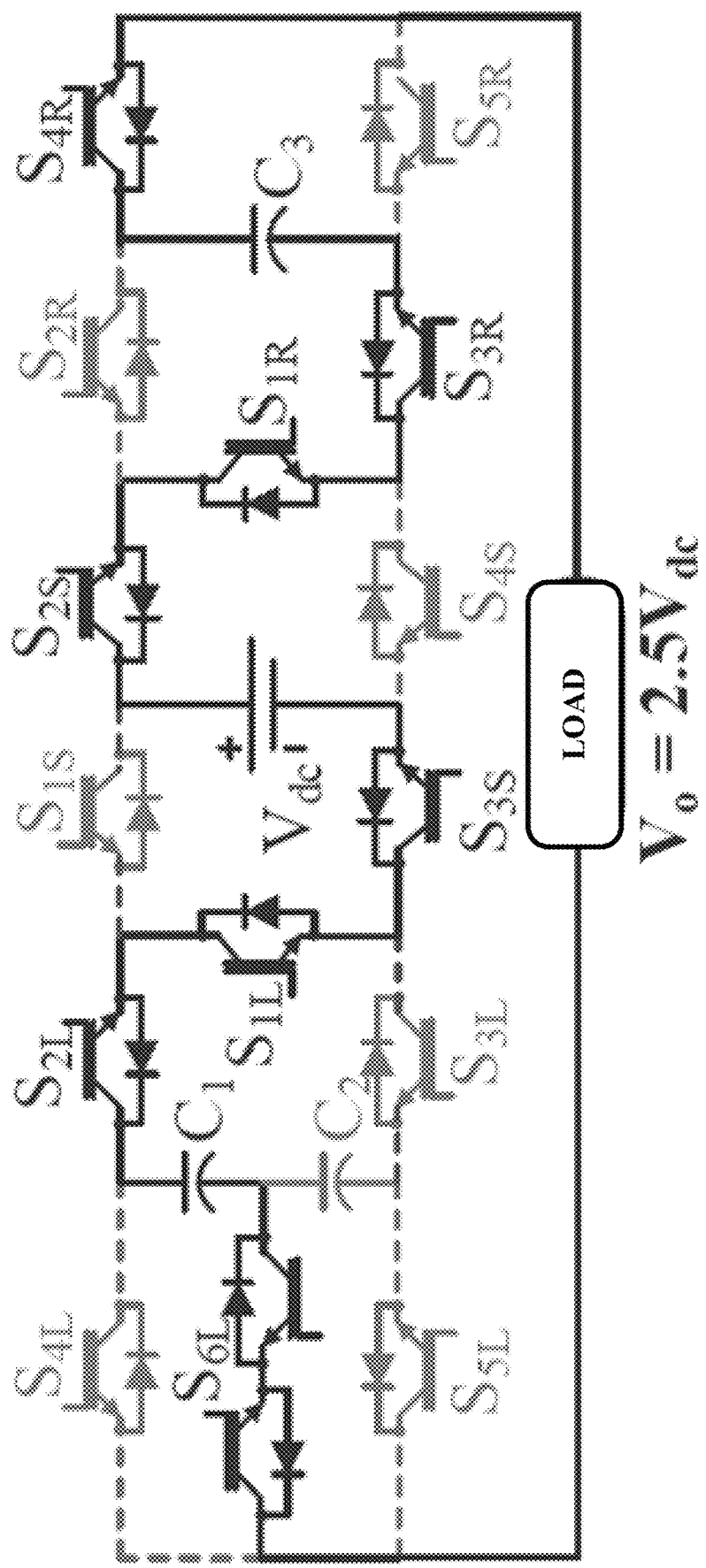

FIG. 2F illustrates the switching arrangement which produces an output (Load) voltage equal to $2.5V_{dc}$. Switches

TABLE 1

Switching states of the 13 level boost topology

| ROW | $S_{1L}$ | $S_{2L}$ | $S_{3L}$ | $S_{4L}$ | $S_{5L}$ | $S_{6L}$ | $S_{1S}$ | $S_{2S}$ | $S_{3S}$ | $S_{4S}$ | $S_{1R}$ | $S_{2R}$ | $S_{3R}$ | $S_{4R}$ | $S_{5R}$ | $V_O$ | $V_{C1}$ | $V_{C2}$ | $V_{C3}$ |
|---|---|---|---|---|---|---|---|---|---|---|---|---|---|---|---|---|---|---|---|
| 1  | 1 | 1 | 0 | 0 | 1 | 0 | 0 | 1 | 1 | 0 | 1 | 0 | 1 | 1 | 0 | $3 V_{dc}$    | D | D | D |
| 2  | 1 | 1 | 0 | 0 | 0 | 1 | 0 | 1 | 1 | 0 | 1 | 0 | 1 | 1 | 0 | $2.5 V_{dc}$  | D | — | D |
| 3  | 0 | 1 | 1 | 0 | 1 | 0 | 1 | 1 | 1 | 0 | 1 | 0 | 1 | 1 | 0 | $2 V_{dc}$    | C | C | D |
| 4  | 1 | 1 | 0 | 0 | 0 | 1 | 0 | 1 | 1 | 0 | 0 | 1 | 0 | 1 | 0 | $1.5 V_{dc}$  | D | — | — |
| 5  | 0 | 1 | 1 | 0 | 1 | 0 | 1 | 1 | 1 | 1 | 0 | 1 | 1 | 1 | 0 | $V_{dc}$      | C | C | C |
| 6  | 0 | 1 | 1 | 0 | 0 | 1 | 1 | 1 | 0 | 0 | 0 | 1 | 0 | 1 | 0 | $0.5 V_{dc}$  | D | — | — |
| 7  | 0 | 1 | 1 | 1 | 0 | 0 | 1 | 1 | 1 | 0 | 0 | 1 | 0 | 1 | 0 | $0 V_{dc}$    | C | C | — |
| 8  | 0 | 0 | 1 | 0 | 0 | 1 | 0 | 0 | 1 | 1 | 0 | 0 | 1 | 0 | 1 | $-0.5 V_{dc}$ | — | D | — |
| 9  | 0 | 1 | 1 | 1 | 0 | 0 | 1 | 1 | 1 | 1 | 0 | 1 | 1 | 0 | 1 | $-V_{dc}$     | C | C | C |
| 10 | 1 | 0 | 0 | 0 | 0 | 1 | 1 | 0 | 0 | 1 | 0 | 0 | 1 | 0 | 1 | $-1.5 V_{dc}$ | — | D | — |
| 11 | 0 | 1 | 1 | 1 | 0 | 0 | 1 | 0 | 1 | 1 | 1 | 1 | 0 | 0 | 1 | $-2 V_{dc}$   | C | C | D |
| 12 | 1 | 0 | 1 | 0 | 0 | 1 | 1 | 0 | 0 | 1 | 1 | 1 | 0 | 0 | 1 | $-2.5 V_{dc}$ | — | D | D |
| 13 | 1 | 0 | 1 | 0 | 0 | 1 | 1 | 0 | 0 | 1 | 1 | 1 | 0 | 0 | 1 | $-3 V_{dc}$   | D | D | D |

In Table 1, "1" denotes a switch which is ON, "0" denotes a switch which is OFF, "D" denotes that a capacitor is discharging, "C" denotes that a capacitor is charging, and a "-" symbol denotes that the capacitor is not changing state.

$S_{1L}$, $S_{2L}$, $S_{6L}$, $S_{2S}$, $S_{3S}$, $S_{1R}$, $S_{3R}$ and $S_{4R}$ are in their ON states. Reference to Row 2 of Table 1 shows that the load voltage is $2.5V_{dc}$ and that $C_1$ and $C_3$ are discharged and $C_2$ does not change state.

Figure 2G:
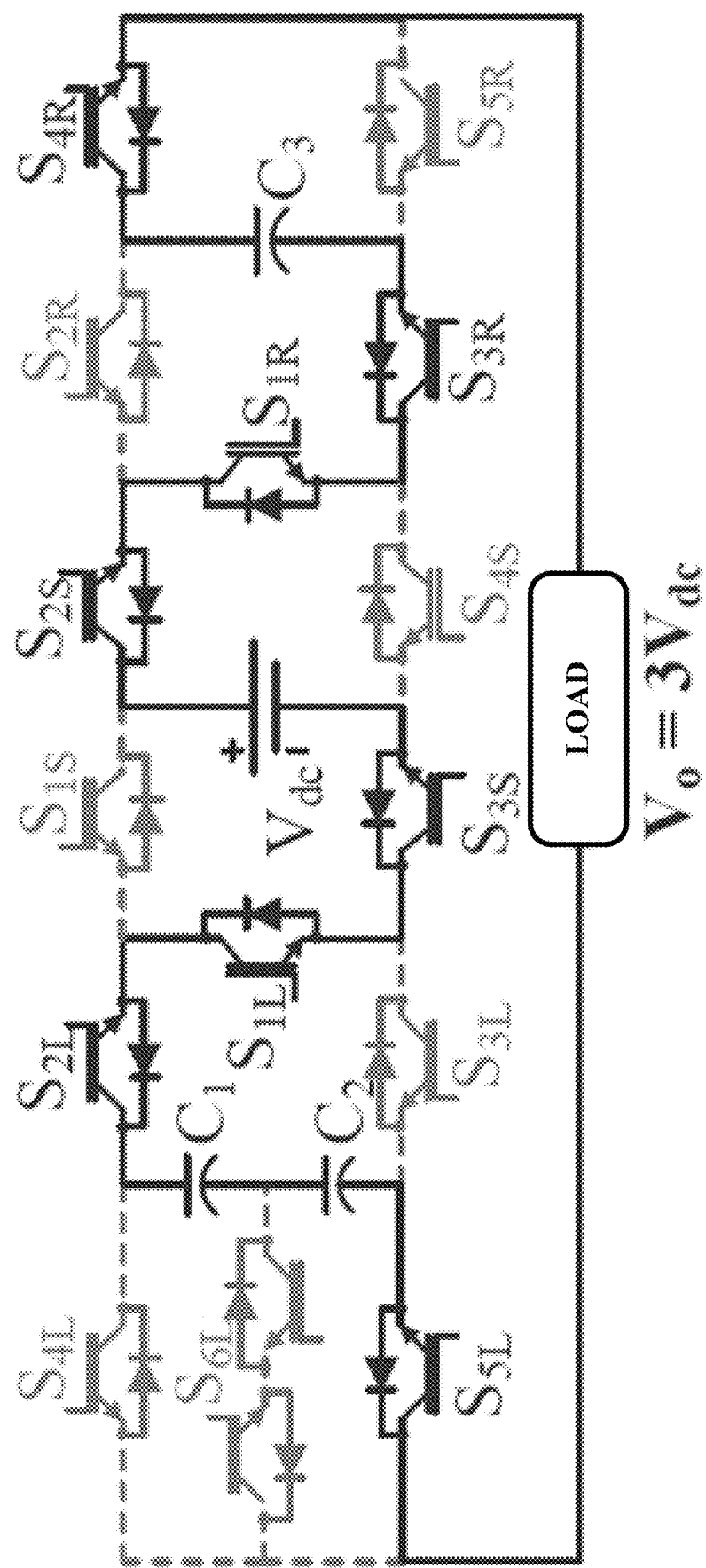

FIG. 2G illustrates the switching arrangement which produces an output (Load) voltage equal to $3V_{dc}$. Switches $S_{1L}$, $S_{2L}$, $S_{5L}$, $S_{2S}$, $S_{3S}$, $S_{1R}$, $S_{3R}$ and $S_{4R}$ are in their ON states. Reference to Row 1 of Table 1 shows that the load voltage is $3V_{dc}$ and that all capacitors are discharged.

The negative load voltages are not illustrated in the figures but the switching patterns are shown in Table 1, rows 8-13.

Figure 3:
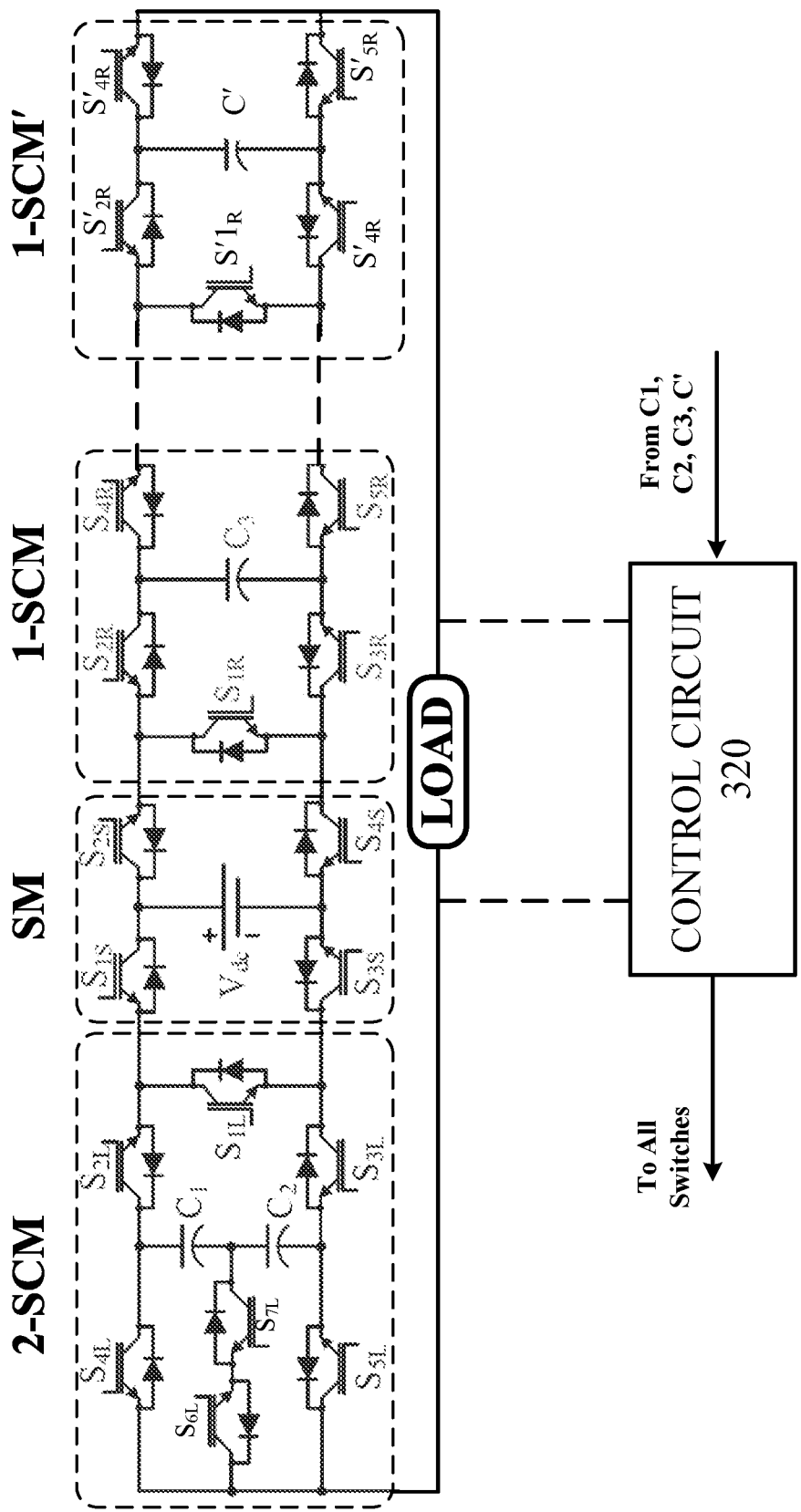
FIG. 3 is a circuit diagram illustrating a generalized structure of the topology.

FIG. 3 illustrates that additional 1-SCM circuit modules (see 1-SCM') can be added in series to the basic unit of FIG. 1, each of which increases the number of levels and the voltage gain. The equations for N levels are given by equation (1):

$$N_{sw} = \frac{1}{4}(5N-1)$$
$$N_{cap} = \frac{1}{4}(N-1)$$
$$G = \frac{1}{4}(N-1)$$
(1)

where $N_{sw}$, $N_{cap}$ and G represent the number of switches, number of capacitors and voltage gain respectively. The gain, G, is a multiple of the voltage level of the DC voltage source, $V_{dc}$.

Each 1-SCM' module adds five switches and one capacitor. The basic unit has sixteen switches and three capacitors. From equation (1), it is clear that the gain equals the number of capacitors, thus the addition of each 1-SCM' module increases the gain by 1. Therefore, the addition of an additional 1-SCM' module to the basic unit increases the number of levels to 17, the gain to 4 and the number of switches to 21. The addition of two 1-SCM' modules to the basic unit increases the number of levels to 21, the gain to 5 and the number of switches to 26.

A controller 320 is connected across the load terminals to monitor the load voltage. The controller is connected at individual outputs (not shown for the sake of clarity) to the gate contacts of each switch. The controller 320 provides drive signals to the gate contacts to selectively turn the switches OFF and ON. The controller may also monitor the capacitor voltages and adjust the circuit parameters to balance the capacitors. The controller may include a processor, such as a microprocessor or microcontroller, connected to memory, such as RAM, ROM, EEPROM, and/or FLASH, and connected to interface circuitry in order to control the switching elements. The controller 320 may also include specialized circuits implemented on, for example, a field programmable gate array (FPGA) and/or an application specific integrated circuit (ASIC) in order to effect control of the switching elements. The controller 320 may also include discrete circuit components (transistors, capacitors, resistors, logic gats, etc.) in order to implement the control functionality. Portions of the functionality of the controller 320 may also be implemented as software stored in the aforementioned memory and executing on the aforementioned processor. The controller may also be co-located with the other circuits in the multilevel inverter or may be located remotely. As such, the specific implementation of the controller 320 is not limiting upon the advancements described in the present disclosure.

Each switch is an insulated-gate bipolar transistor (IGBT) and each DC voltage source in the level generation module and the auxiliary DC voltage source has the same voltage value.

For the control of switches of multi-level boost inverter of FIG. 1A-FIG. 3, level-shifted pulse width modulation (LS-PWM) has been used. "Level shifted" is defined as shifting an entire waveform up or down by adding DC voltage to the pulse signal.

Figure 4:
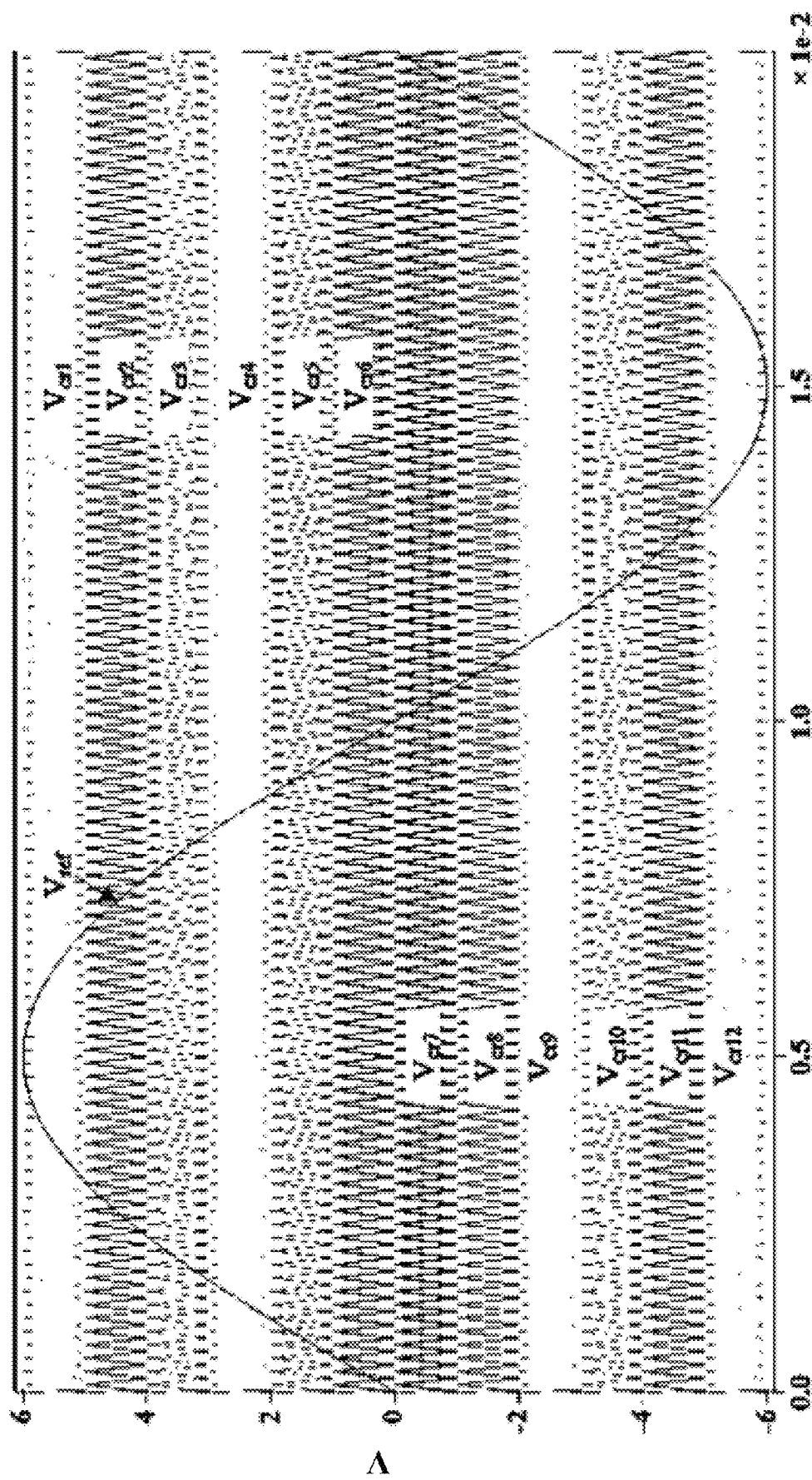
FIG. 4 illustrates the LS-PWM for the 13 level topology.
Figure 5:
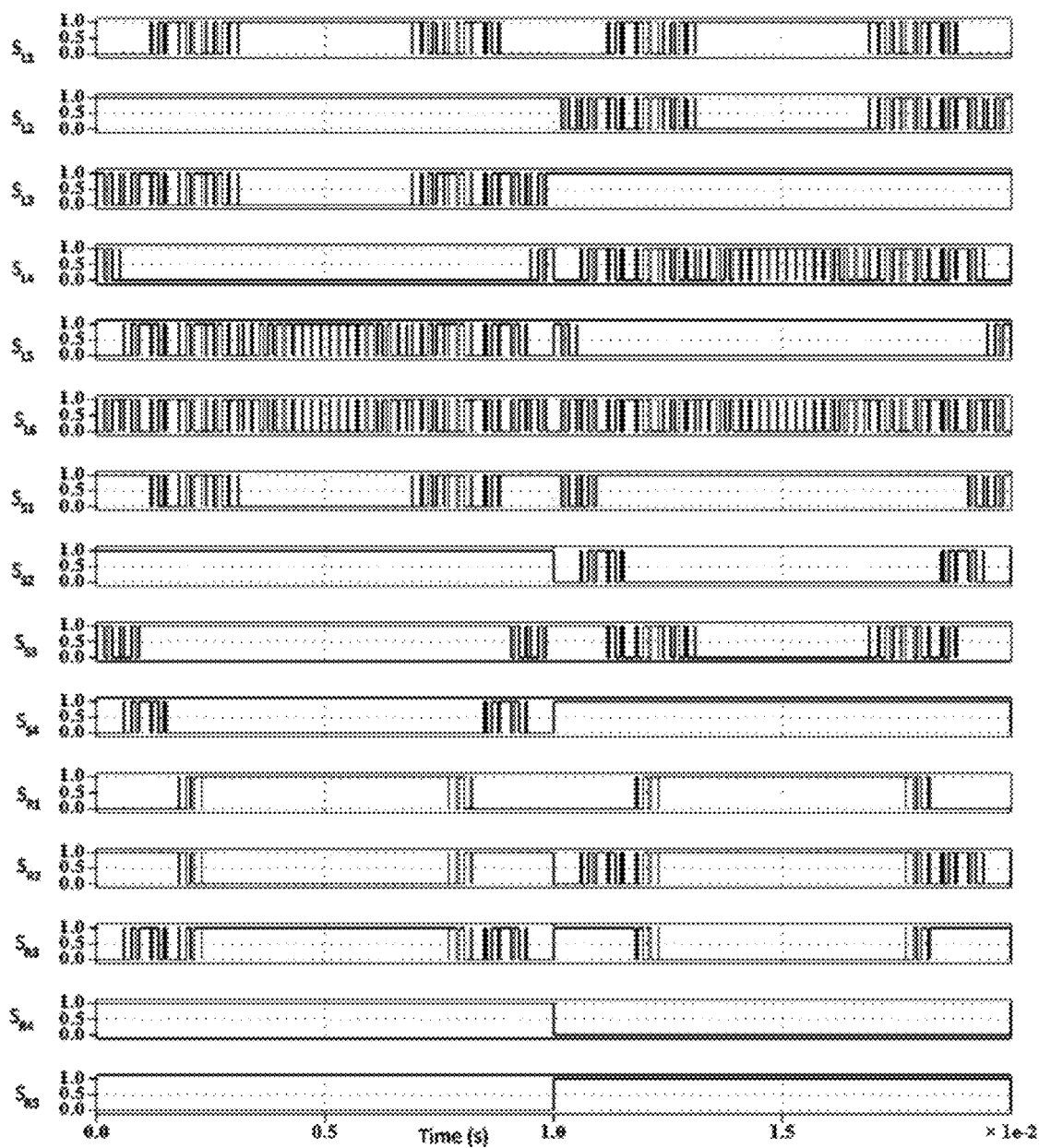
FIG. 5 illustrates the switching gate pulses for all of the switches.

In LS-PWM, for the example of the 13 level circuit topology (FIG. 1A), 12 carrier signals of high frequency with same amplitude, $A_c$, are compared with a sinusoidal reference signal having an output voltage frequency. FIG. 4 shows the 12 carrier signals ($V_{cr1}$, $V_{cr2}$, . . . , $V_{cr12}$) with respect to the reference signal, $V_{ref}$. The comparison between the reference and carrier signals is used in a switching table to produce the desired gate pulses for each switch. The gate pulse for each switch is shown in FIG. 5.

The 13 level boost inverter circuit was simulated using PLECS software. The different parameters used for the simulation are shown in Table 2. LS-PWM was used with carrier frequency of 5 kHz for the simulation.

TABLE 2

| Simulation parameters | |
|---|---|
| Parameter | Value |
| Input Voltage | 100 V |
| Output frequency | 50 Hz |
| Carrier frequency | 5 kHz |
| Resistive load | 50 Ω |
| Resistive-inductive load | 100 mH + 100 Ω |

Figure 6:
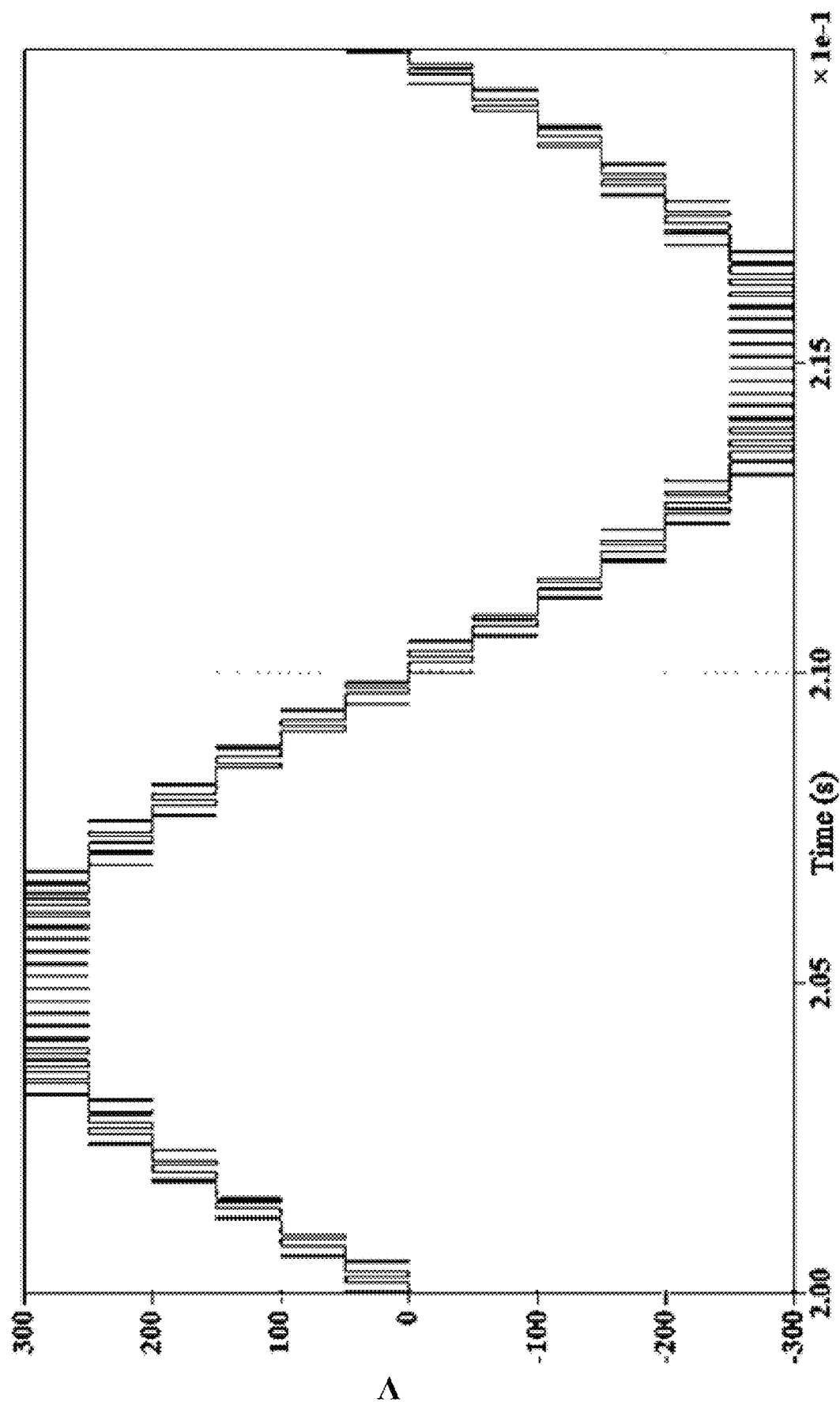
FIG. 6 is a graph illustrating 13 level output voltage waveform with LS-PWM.

FIG. 6 illustrates the simulated output voltage waveform. With 100V input voltage, the peak of the output voltage has a magnitude of 300V, which confirms the triple voltage gain. Each voltage level of the 13 level output voltage waveform has a voltage step of 50V generated by the two capacitors $C_1$ and $C_2$.

Figure 7:
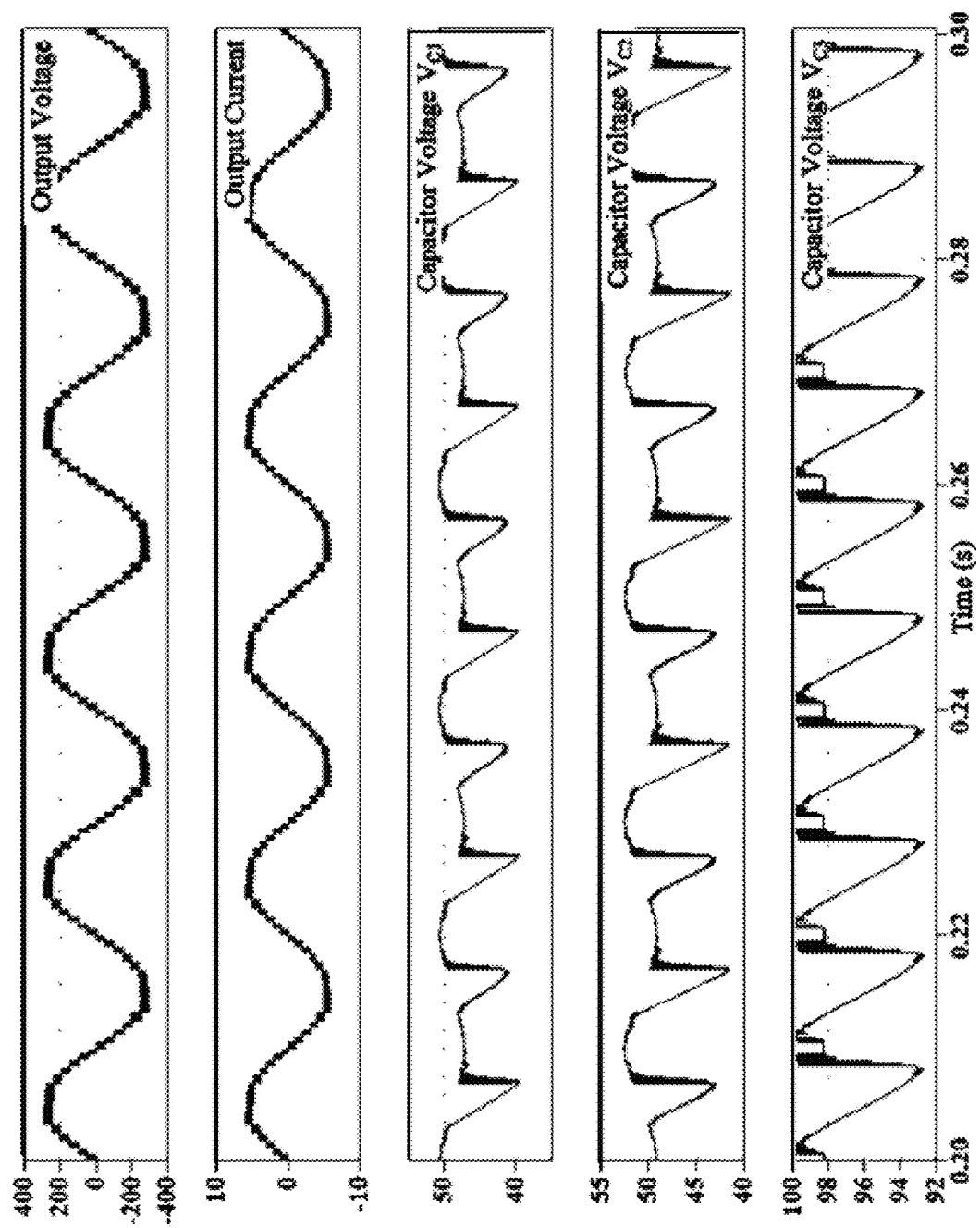
FIG. 7 illustrates the output voltage, current and capacitor voltages of the 13 level topology with Z=50Ω.

The circuit was tested under different loading conditions. FIG. 7 depicts the output voltage, output current and three capacitor voltages with a resistive load of 50Ω. The voltages of capacitors $C_1$ and $C_2$, $V_{C1}$ and $V_{C2}$ are balanced at a voltage equal to half of the input voltage (0.5$V_{dc}$), i.e., 50V. Similarly the voltage of capacitor $C_3$, i.e., $V_{C3}$, settles at a voltage equal to the input voltage i.e., 100V. With a resistive load, the load current has an identical waveform to the waveform of the output voltage with a peak magnitude of 6 A.

Figure 8:
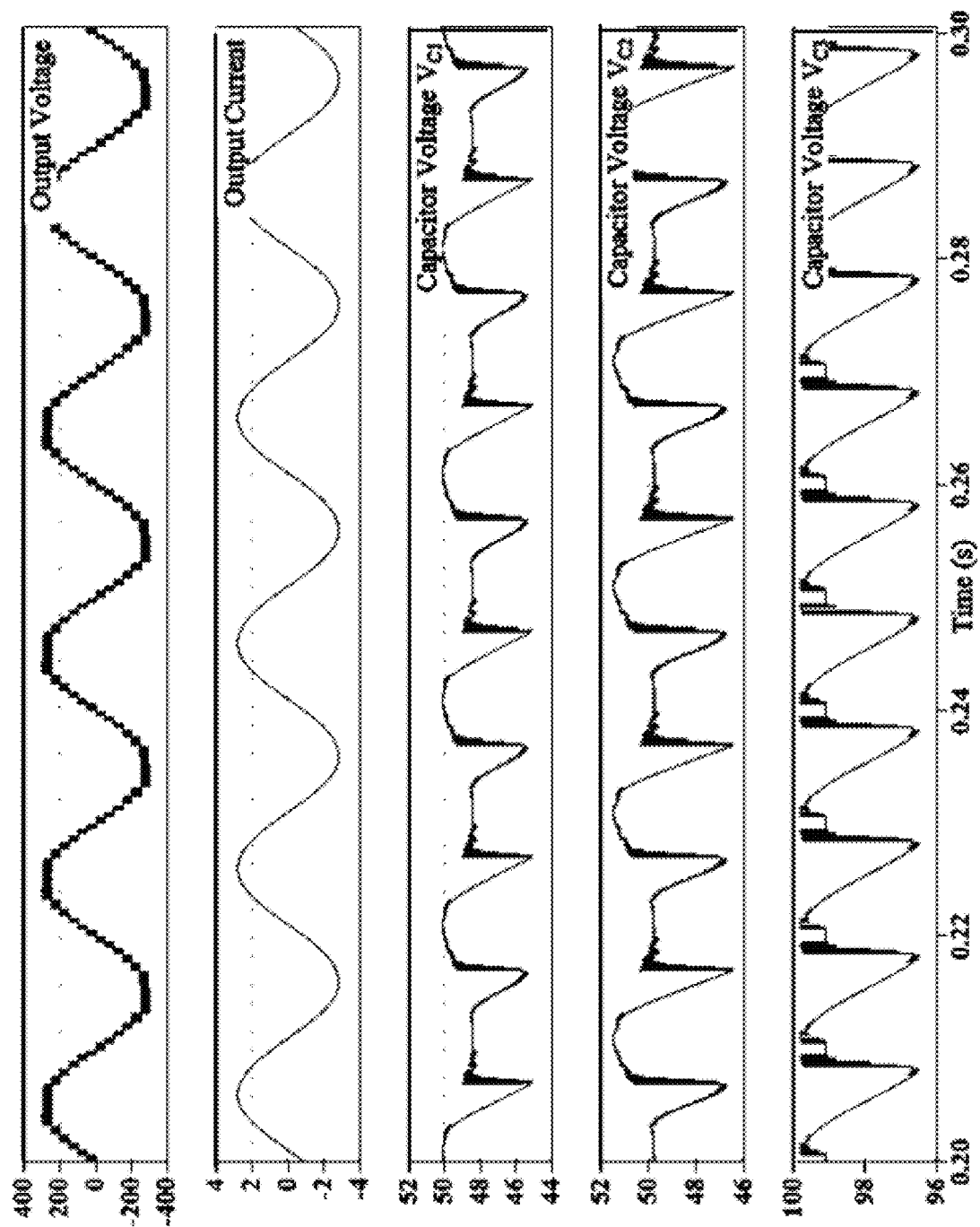
FIG. 8 illustrates the output voltage, current and capacitor voltages of the 13 level topology with Z=100 mH+50Ω.

In addition, the 13 level switched capacitor boost inverter was tested with a series combination of a resistive-inductive load. FIG. 8 shows the output voltage, output current and capacitor voltages with load parameter of Z=100 mH+100Ω. With an inductive load, the current waveform smooths and lags the output voltage by an angle of 17.5°. All three capacitor voltages are balanced with a small amount of ripple voltage.

Figure 9:
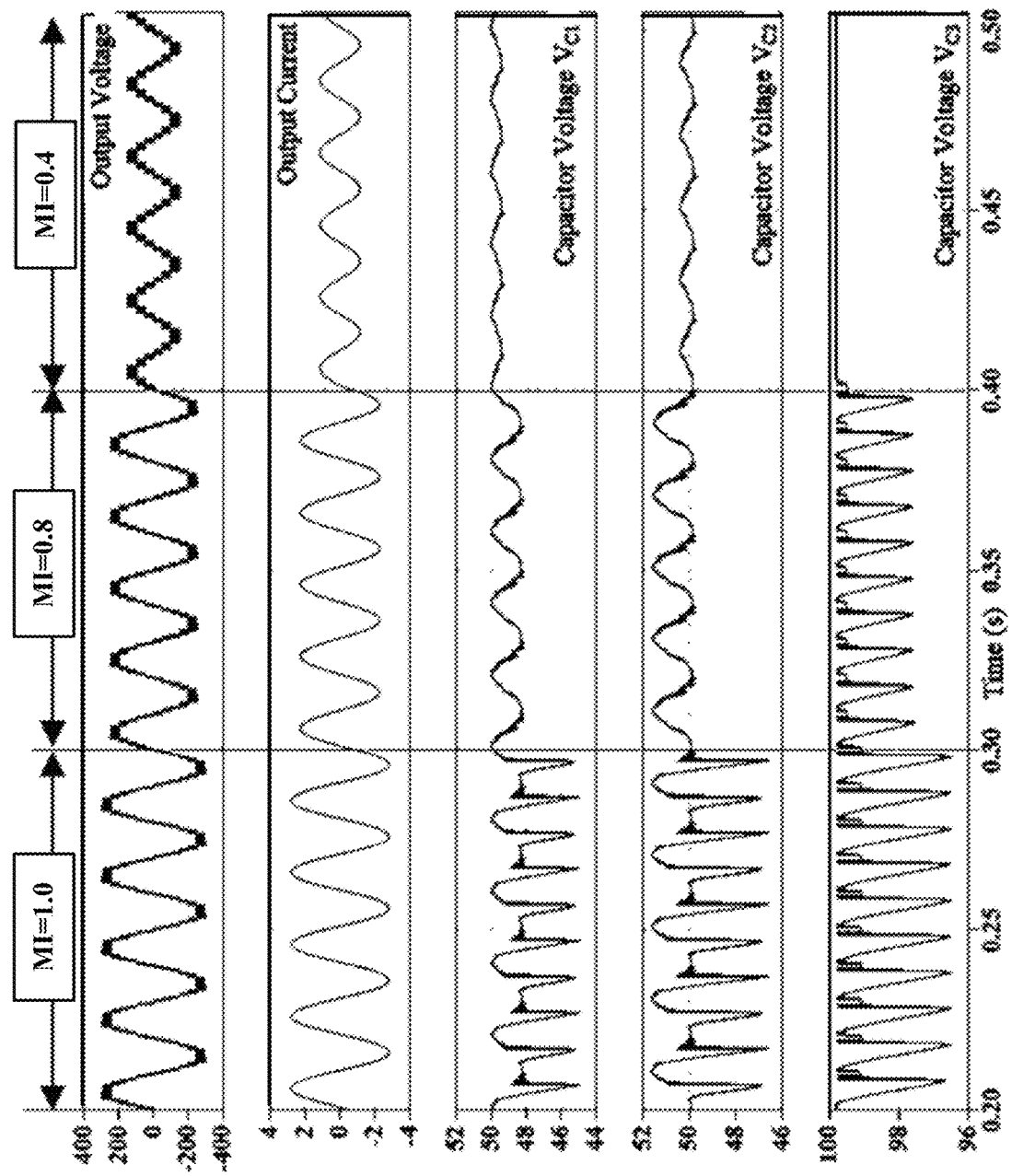
FIG. 9 illustrates the output voltage, current and capacitor voltages of the 13 level topology for change of modulation index with Z=100 mH+50Ω.

Furthermore, the 13 level switched capacitor boost inverter was tested with changes in the dynamic modulation index (MI). FIG. 9 shows the output voltage, output current and capacitor voltage with a change of modulation index. The modulation index was varied from 1.0 to 0.8 to 0.4. At each change in the modulation index, the capacitor voltages balanced. The results of FIG. 7-9 under different loading conditions and modulation index demonstrate the self-voltage balancing of all three capacitors.

The first embodiment is illustrated with respect to FIG. 1A-3 and FIGS. 10-13. The first embodiment describes a multilevel switched capacitor boost inverter 100 comprising a two-switched capacitor circuit (2-SCM) including a first capacitor ($C_1$), a second capacitor ($C_2$) and a first plurality of switches, $S_L$, a first one-switched capacitor circuit (1-SCM) including a third capacitor ($C_3$) and a second plurality of switches, $S_R$, a source circuit (SM) including a DC voltage source ($V_{dc}$) and a third plurality of switches, $S_S$. The source circuit, SM, is connected in series between the two-switched capacitor circuit (2-SCM) and the first one-switched capacitor circuit (1-SCM). The multi-level switched capacitor boost inverter further includes a pair of load terminals (102, 104). A control circuit 120 is operatively connected to the the pair of load terminals, the first, second and third capacitors and the first, second and third plurality of switches. The control circuit is configured to selectively operate the first, second and third plurality of switches to balance the first ($C_1$) and second capacitors ($C_2$) and provide an output voltage across the pair of load terminals (102, 104).

The first plurality of switches, $S_L$, further comprises first, second, third, fourth and fifth unidirectional semiconductor switches ($S_{1L}$-$S_{5L}$), and a first bi-directional semiconductor switch.

The second plurality of switches, $S_R$, further comprises five unidirectional semiconductor switches ($S_{1R}$-$S_{5R}$).

The third plurality of switches, $S_S$, further comprises four unidirectional semiconductor switches ($S_{1S}$-$S_{4S}$).

Each unidirectional semiconductor switch (106, FIG. 1B) comprises a transistor 108 having an emitter, E, a collector, C, and a gate, G, and a diode, D) connected antiparallel to the transistor.

The first plurality of switches, $S_L$, further comprises a first unidirectional switch ($S_{1L}$) having a first emitter, a first collector and a first gate, a second unidirectional switch ($S_{2L}$) having a second emitter, a second collector and a second gate, a third unidirectional switch ($S_{3L}$) having a third emitter, a third collector and a third gate, a fourth unidirectional switch ($S_{4L}$) having a fourth emitter, a fourth collector and a fourth gate, a fifth unidirectional switch ($S_{5L}$) having a fifth emitter, a fifth collector and a fifth gate, the first bi-directional semiconductor switch including a sixth unidirectional switch ($S_{6L}$) having a sixth emitter, a sixth collector and a sixth gate and a seventh unidirectional switch ($S_{7L}$) having a seventh emitter, a seventh collector and a seventh gate, the emitter of the sixth unidirectional switch connected to the emitter of the seventh unidirectional switch, wherein the first capacitor, $C_1$, has a first positive and a first negative terminal, and wherein the second capacitor, $C_2$, has a second positive and a second negative terminal (as indicated by the capacitor terminals of FIG. 1A, where a straight line indicates a positive terminal and a curved line indicates a negative terminal).

The collector of the first unidirectional switch ($S_{1L}$) is connected to the emitter of the second unidirectional switch ($S_{2L}$), wherein the emitter of the first unidirectional switch is connected to the collector of the third unidirectional switch ($S_{3L}$), wherein the collector of the second unidirectional switch is connected to the positive terminal of the first capacitor ($C_1$), wherein the emitter of the third unidirectional switch is connected to the negative terminal of the second capacitor ($C_2$), wherein the negative terminal of the first capacitor is connected to the positive terminal of the second capacitor, wherein the collector of the fourth unidirectional switch ($S_{4L}$) is connected to the positive terminal of the first capacitor, wherein the emitter of the fifth unidirectional switch ($S_{5L}$) is connected to the negative terminal of the second capacitor, wherein the collector of the sixth unidirectional switch ($S_{6L}$) is connected to the emitter of the fourth unidirectional switch and to the collector of the fifth unidirectional switch, and wherein the collector of the seventh unidirectional switch ($S_{7L}$) is connected to the negative terminal of the first capacitor.

The second plurality of switches, $S_R$, comprises an eighth unidirectional switch ($S_{1R}$) having an eighth emitter, an eighth collector and an eighth gate, a ninth unidirectional switch ($S_{2R}$) having a ninth emitter, a ninth collector and a ninth gate, a tenth unidirectional switch ($S_{3R}$) having a tenth emitter, a tenth collector and a tenth gate, an eleventh unidirectional switch ($S_{4R}$) having an eleventh emitter, an eleventh collector and an eleventh gate, a twelfth unidirectional switch ($S_{5R}$) having a twelfth emitter, a twelfth collector and a twelfth gate and wherein the third capacitor ($C_3$) has a third positive and a third negative terminal.

The collector of the eighth unidirectional switch ($S_{1R}$) is connected to the emitter of the ninth unidirectional switch ($S_{2R}$), wherein the emitter of the eighth unidirectional switch is connected to the collector of the tenth unidirectional switch ($S_{3R}$), wherein the emitter of the eleventh unidirectional switch ($S_{4R}$) is connected to the collector of the twelfth unidirectional switch ($S_{5R}$), wherein the collector of the ninth unidirectional switch ($S_{2R}$) and the collector of the eleventh unidirectional switch ($S_{4R}$) are connected to the positive terminal of the third capacitor, and wherein the emitter of the tenth unidirectional switch ($S_{3R}$) and the emitter of the twelfth unidirectional switch ($S_{5R}$) are connected to the negative terminal of the capacitor.

The third plurality of switches, $S_S$, further comprises a thirteenth unidirectional switch ($S_{1S}$) having a thirteenth emitter, a thirteenth collector and a thirteenth gate, a fourteenth unidirectional switch ($S_{2S}$) having a fourteenth emitter, a fourteenth collector and a fourteenth gate, a fifteenth unidirectional switch ($S_{3S}$) having a fifteenth emitter, a fifteenth collector and a fifteenth gate, a sixteenth unidirectional switch ($S_{4S}$) having a sixteenth emitter, a sixteenth collector and a sixteenth gate, wherein the DC voltage source has a positive connector and a negative connector, and wherein the load terminals include a first load terminal 102 and a second load terminal 104.

The collector of the thirteenth unidirectional switch ($S_{1S}$) and the collector of the fourteenth unidirectional switch ($S_{2S}$) are connected to the positive connector of the DC voltage source, wherein the emitter of the fifteenth unidirectional switch ($S_{1S}$) and the emitter of the sixteenth unidirectional switch ($S_{2S}$) are connected to the negative connector of the DC voltage source, wherein the emitter of the thirteenth unidirectional switch ($S_{1S}$) is connected to the emitter of the second unidirectional switch ($S_{2L}$), wherein the collector of the fifteenth unidirectional switch ($S_{3S}$) is connected to the collector of the third unidirectional switch ($S_{3L}$), wherein the emitter of the fourteenth unidirectional switch ($S_{2S}$) is connected to the emitter of the ninth unidirectional switch ($S_{2R}$), and wherein the collector of the sixteenth unidirectional switch ($S_{4S}$) is connected to the collector of the tenth unidirectional switch ($S_{3R}$), the first load terminal 102 is connected to the collector of the sixth unidirectional switch ($S_{6L}$), and wherein the second load terminal 104 is connected to the collector of the twelfth unidirectional switch ($S5_R$).

The control circuit 120 is operatively connected to the gates (G) of the first, second and third plurality of switches, the first, second and third positive and negative terminals of the capacitors, the positive and negative connector of the DC voltage source and the first and second load terminals, wherein the control circuit is configured to provide gate pulses to the gates of the first, second and third plurality of switches to selectively generate thirteen voltage levels at the first and second load terminals.

An additional one-switched capacitor circuit (1-SCM', FIG. 3) may be connected in series with the first one-switched capacitor circuit (1-SCM), the additional one-switched capacitor circuit (1-SCM') including an additional five unidirectional switches ($S'_{1R}$)-($S'_{5R}$) and an additional capacitor ($C3'$), wherein the first load terminal 102 is connected to the collector of the sixth unidirectional switch, and wherein the second load terminal 104 is connected in parallel with the additional capacitor ($C3'$).

The control circuit 320 is operatively connected to the gates of the first, second and third plurality of switches, the gates of the additional switches, the first, second, third and additional positive and negative terminals of the capacitors ($C_1$, $C_2$, $C_3$, $C_4$), the positive and negative connector of the DC voltage source ($V_{dc}$) and the first 102 and second 104 load terminals, and wherein the control circuit is configured to selectively provide gate pulses to the gates of the first, second and third plurality of switches and the additional switches to generate seventeen voltage levels at the first and second load terminals.

The second embodiment is illustrated with respect to FIG. 1A-FIG. 13. The second embodiment describes a method of operating a multi-level switched capacitor boost inverter 100, comprising generating, by a control circuit (120, FIG. 1; 320, FIG. 3), a plurality of gate pulses using level-shifted pulse width modulation (LS-PWM) (FIG. 4 shows the level-shifted pulse width modulation pulses), applying the gate pulses (gate pulses, FIG. 5) to a plurality of unidirectional semiconductor switches of the multi-level switched capacitor boost inverter (see Table 1 and FIG. 2A-FIG. 2G), charging, by a DC voltage source, a pair of series connected capacitors ($C_1$, $C_2$) of a two-switched capacitor circuit (2-SCM) of the multi-level switched capacitor boost inverter, adjusting the gate pulses to balance each of the series connected capacitors to have a same voltage magnitude, charging, by the DC voltage source ($V_{dc}$) of a source circuit (SM) of multi-level switched capacitor boost inverter, a first output capacitor ($C_3$) of a first one-switched capacitor circuit (1-SCM) of the multi-level switched capacitor boost inverter, and generating a thirteen-level output voltage (FIG. 6) across a pair of load terminals 102, 104 equal to the charge on the first output capacitor ($C_3$).

The method of operating a multi-level switched capacitor boost inverter further comprises charging, by the DC voltage source of a source circuit of multi-level switched capacitor boost inverter, a second output capacitor ($C'_3$) of a second one-switched capacitor circuit (1-SCM') of the multi-level switched capacitor boost inverter, and generating a seventeen-level output voltage across a pair of load terminals equal to the charge on the second output capacitor.

The third embodiment is illustrated with respect to FIG. 1A-FIG. 13. The third embodiment describes a method of providing a multi-level switched capacitor boost inverter (100, 300, FIG. 1, FIG. 3), comprising connecting a two-switched capacitor circuit (2-SCM), a source circuit (SM) and at least one first one-switched capacitor circuit (1-SCM) in series, connecting a load across the two-switched capacitor circuit and the at least one first one-switched capacitor circuit, operatively connecting a control circuit (120, 320, FIG. 1, FIG. 3) to each gate (G) of a plurality of switches ($S_{1L}$-$S_{6L}$, $S_{1S}$-$S_{4S}$, $S_{1R}$-$S_{5R}$) of the two-switched capacitor circuit, the source circuit and the at least one first one-switched capacitor circuit, the capacitors ($C_1$-$C_3$) and across the load, generating, by the control circuit, a plurality of gate pulses using level-shifted pulse width modulation (LS-PWM) (FIG. 4 shows the level-shifted pulse width modulation pulses), applying the gate pulses (gate pulses, FIG. 5) to the plurality of switches, charging, with a DC voltage source, a pair of series connected capacitors ($C_1$, $C_2$) of the two-switched capacitor circuit ($C_1$, $C_2$), adjusting the gate pulses to balance each of the series connected capacitors to have a same voltage magnitude, charging, by the DC voltage source ($V_{dc}$) of a source circuit (SM) of the multi-level switched capacitor boost inverter, an output capacitor ($C_3$) of the one-switched capacitor circuit, and generating an output voltage across the load equal to the charge on the output capacitor, wherein the output voltage has thirteen voltage levels and a gain equal to three.

The method of providing a multi-level switched capacitor boost inverter further comprises determining a number of voltage levels, N, to be provided to the load by the switched capacitor multi-level boost inverter, determining a number of switches, $N_{SW}$, needed to provide the number of voltage levels by $N_{SW}=\frac{1}{4}(5N-1)$, determining a number of capacitors, $N_{CAP}$, needed to provide the number of voltage levels by $N_{CAP}=\frac{1}{4}(N-1)$, and determining a voltage gain, G, across the load by $G=\frac{1}{4}(N-1)$.

The method of providing a multi-level switched capacitor boost inverter further comprises connecting at least one additional one-switched capacitor circuit (1-SCM') in series with the first one-switched capacitor circuit (1-SCM), connecting the load across the two-switched capacitor circuit (2-SCM) and the at least one additional one-switched capacitor circuit (1-SCM'), operatively connecting the control circuit 320 to provide gate pulses to the at least one additional one-switched capacitor circuit, charging, by the DC voltage source, an additional output capacitor ($C'_3$) of the at least one additional one-switched capacitor circuit, and generating an output voltage across the load equal to the charge on the additional output capacitor, wherein the output voltage has seventeen levels and a gain equal to four.

Figure 10:
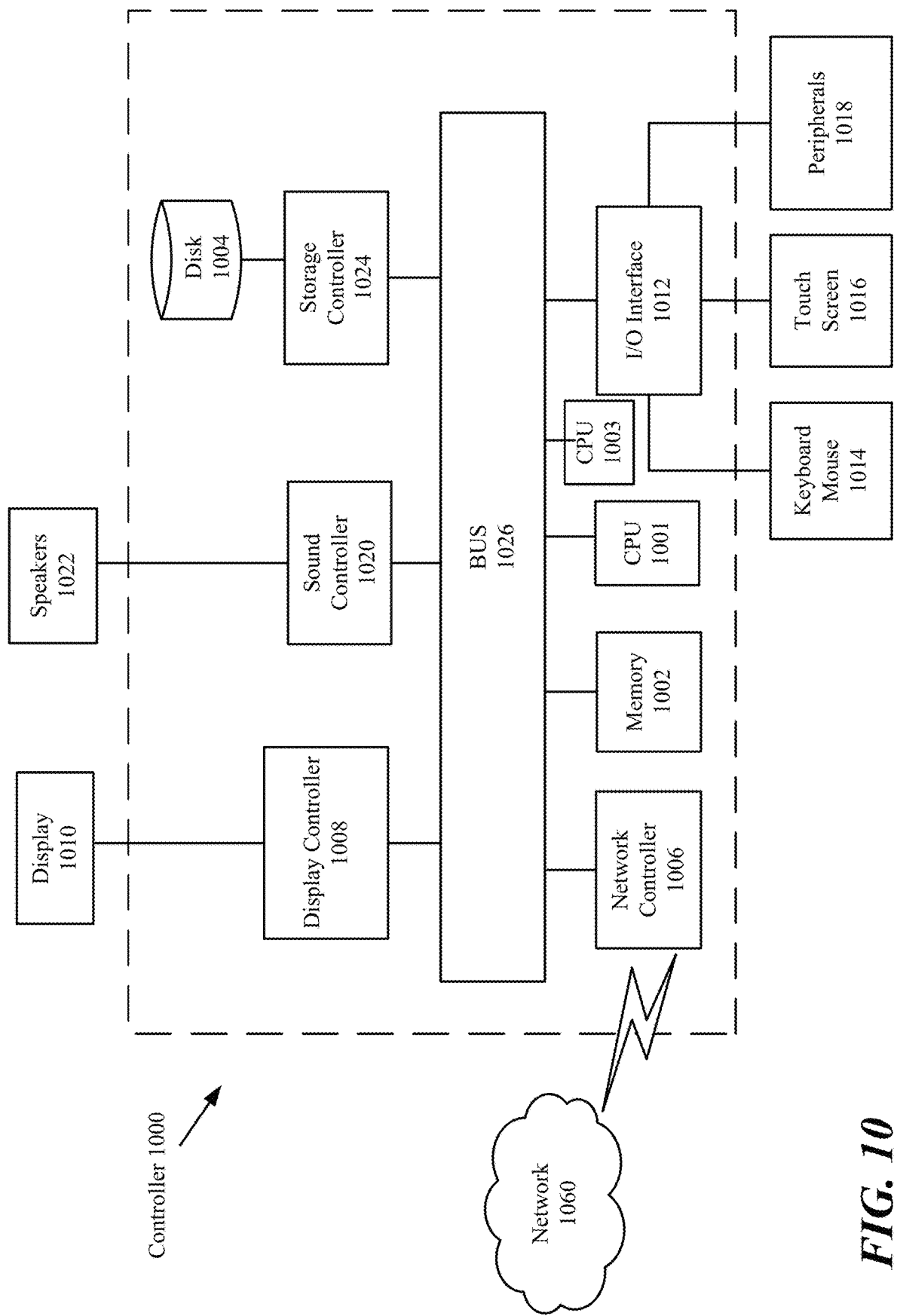
FIG. 10 is an illustration of a non-limiting example of details of computing hardware used in the computing system, according to certain embodiments.

Next, further details of the hardware description of the controllers (120/320) of FIG. 1A and FIG. 3 according to exemplary embodiments is described with reference to FIG. 10. In FIG. 10, a controller 1000 is described is representative of the controllers (120/320) of FIG. 1A and FIG. 3 in which the controller is a computing device which includes a CPU 1001 which performs the processes described above/below. The process data and instructions may be stored in memory 1002. These processes and instructions may also be stored on a storage medium disk 1004 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1001, 1003 and an operating system such as Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 1001 or CPU 1003 may be a Xenon or Core processor from Intel of America or an Opteron processor from AMD of America, or may be other processor types that would be recognized by one of ordinary skill in the art. Alternatively, the CPU 1001, 1003 may be implemented on an FPGA, ASIC, PLD or using discrete logic circuits, as one of ordinary skill in the art would recognize. Further, CPU 1001, 1003 may be implemented as multiple processors cooperatively working in parallel to perform the instructions of the inventive processes described above.

The computing device in FIG. 10 also includes a network controller 1006, such as an Intel Ethernet PRO network interface card from Intel Corporation of America, for interfacing with network 1060. As can be appreciated, the network 1060 can be a public network, such as the Internet, or a private network such as an LAN or WAN network, or any combination thereof and can also include PSTN or ISDN sub-networks. The network 1060 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 1008, such as a NVIDIA GeForce GTX or Quadro graphics adaptor from NVIDIA Corporation of America for interfacing with display 1010, such as a Hewlett Packard HPL2445w LCD monitor. A general purpose I/O interface 1012 interfaces with a keyboard and/or mouse 1014 as well as a touch screen panel 1016 on or separate from display 1010. General purpose I/O interface also connects to a variety of peripherals 1018 including printers and scanners, such as an OfficeJet or DeskJet from Hewlett Packard.

A sound controller 1020 is also provided in the computing device such as Sound Blaster X-Fi Titanium from Creative, to interface with speakers/microphone 1022 thereby providing sounds and/or music.

The general purpose storage controller 1024 connects the storage medium disk 1004 with communication bus 1026, which may be an ISA, EISA, VESA, PCI, or similar, for interconnecting all of the components of the computing device. A description of the general features and functionality of the display 1010, keyboard and/or mouse 1014, as well as the display controller 1008, storage controller 1024, network controller 1006, sound controller 1020, and general purpose I/O interface 1012 is omitted herein for brevity as these features are known. The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 11.

Figure 11:
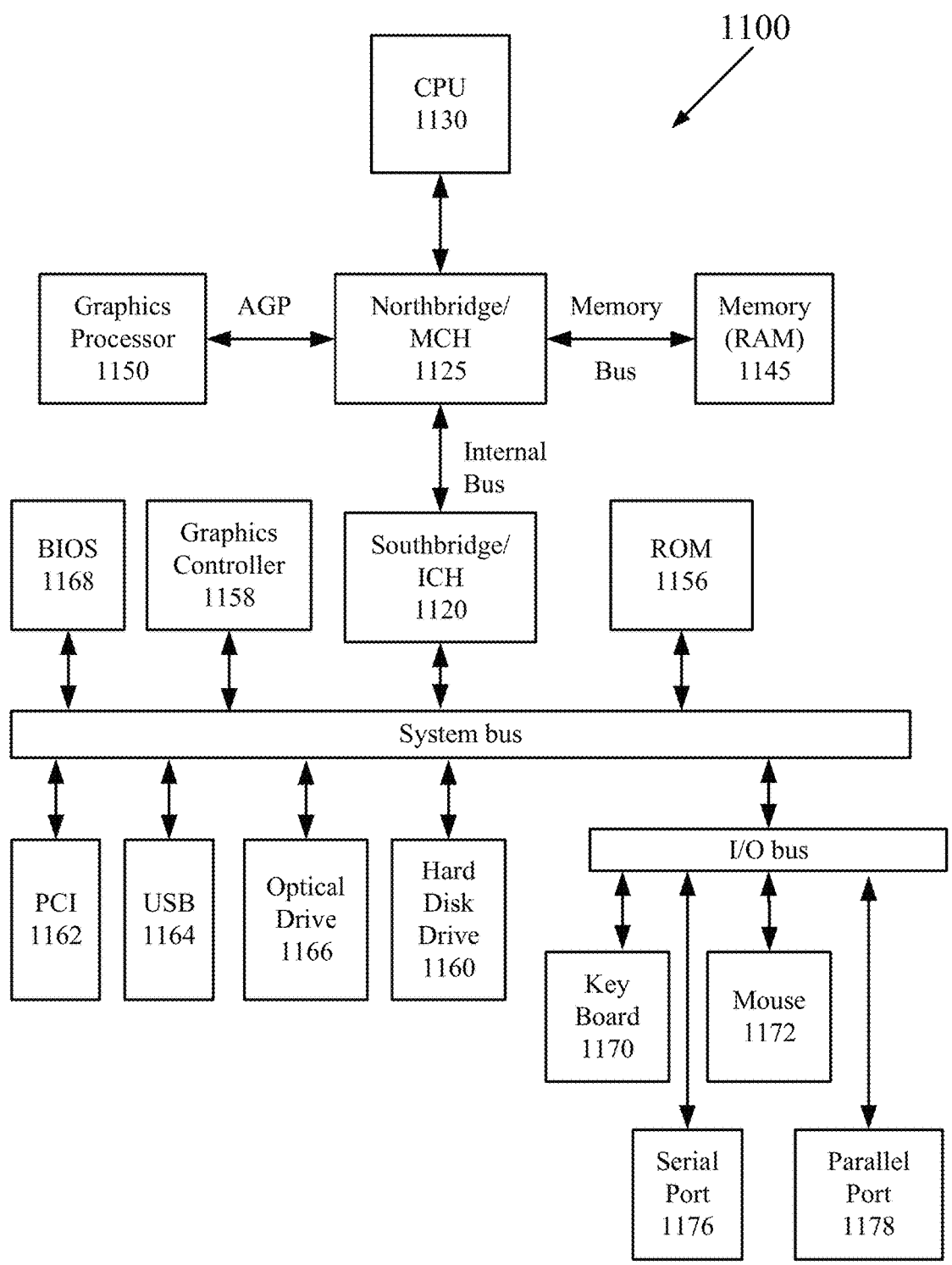
FIG. 11 is an exemplary schematic diagram of a data processing system used within the computing system, according to certain embodiments.

FIG. 11 shows a schematic diagram of a data processing system, according to certain embodiments, for performing the functions of the exemplary embodiments. The data processing system is an example of a computer in which code or instructions implementing the processes of the illustrative embodiments may be located.

In FIG. 11, data processing system 1100 employs a hub architecture including a north bridge and memory controller hub (NB/MCH) 1125 and a south bridge and input/output (I/O) controller hub (SB/ICH) 1120. The central processing unit (CPU) 1130 is connected to NB/MCH 1125. The NB/MCH 1125 also connects to the memory 1145 via a memory bus, and connects to the graphics processor 1150 via an accelerated graphics port (AGP). The NB/MCH 1125 also connects to the SB/ICH 1120 via an internal bus (e.g., a unified media interface or a direct media interface). The CPU Processing unit 1130 may contain one or more processors and even may be implemented using one or more heterogeneous processor systems.

Figure 12:
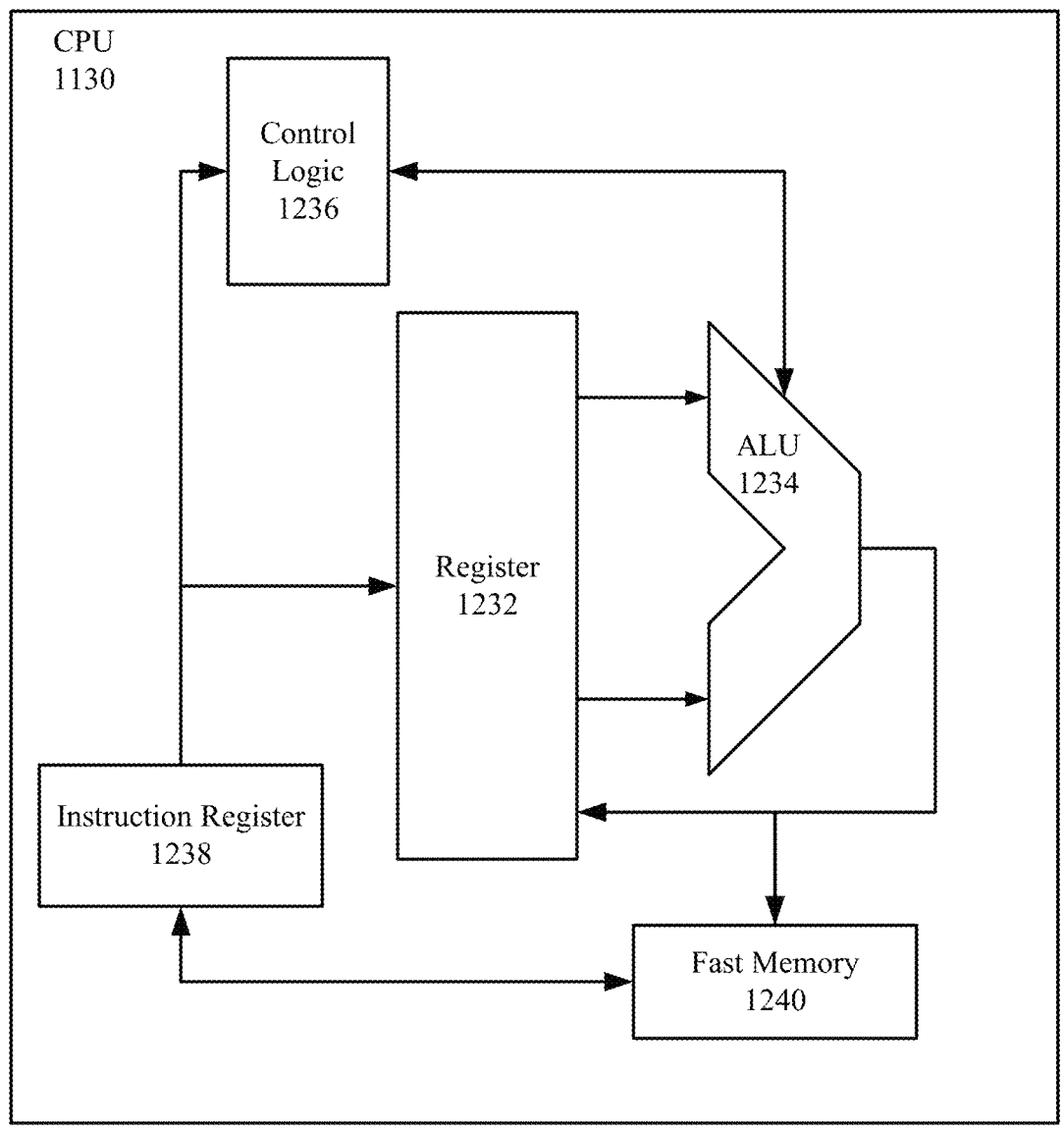
FIG. 12 is an exemplary schematic diagram of a processor used with the computing system, according to certain embodiments.

For example, FIG. 12 shows one implementation of CPU 1130. In one implementation, the instruction register 1238 retrieves instructions from the fast memory 1240. At least part of these instructions are fetched from the instruction register 1238 by the control logic 1236 and interpreted according to the instruction set architecture of the CPU 1130. Part of the instructions can also be directed to the register 1232. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1234 that loads values from the register 1232 and performs logical and mathematical operations on the loaded values according to the instructions. The results from these operations can be feedback into the register and/or stored in the fast memory 1240. According to certain implementations, the instruction set architecture of the CPU 1230 can use a reduced instruction set architecture, a complex instruction set architecture, a vector processor architecture, a very large instruction word architecture. Furthermore, the CPU 1230 can be based on the Von Neuman model or the Harvard model. The CPU 1230 can be a digital signal processor, an FPGA, an ASIC, a PLA, a PLD, or a CPLD. Further, the CPU 1230 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 11, the data processing system 1100 can include that the SB/ICH 1120 is coupled through a system bus to an I/O Bus, a read only memory (ROM) 1156, universal serial bus (USB) port 1164, a flash binary input/output system (BIOS) 1168, and a graphics controller 1158. PCI/PCIe devices can also be coupled to SB/ICH 1188 through a PCI bus 1162.

The PCI devices may include, for example, Ethernet adapters, add-in cards, and PC cards for notebook computers. The Hard disk drive 1160 and CD-ROM 1166 can use, for example, an integrated drive electronics (IDE) or serial advanced technology attachment (SATA) interface. In one implementation the I/O bus can include a super I/O (SIO) device.

Further, the hard disk drive (HDD) 1160 and optical drive 1166 can also be coupled to the SB/ICH 1120 through a system bus. In one implementation, a keyboard 1170, a mouse 1172, a parallel port 1178, and a serial port 1176 can be connected to the system bus through the I/O bus. Other peripherals and devices that can be connected to the SB/ICH 1120 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 13:
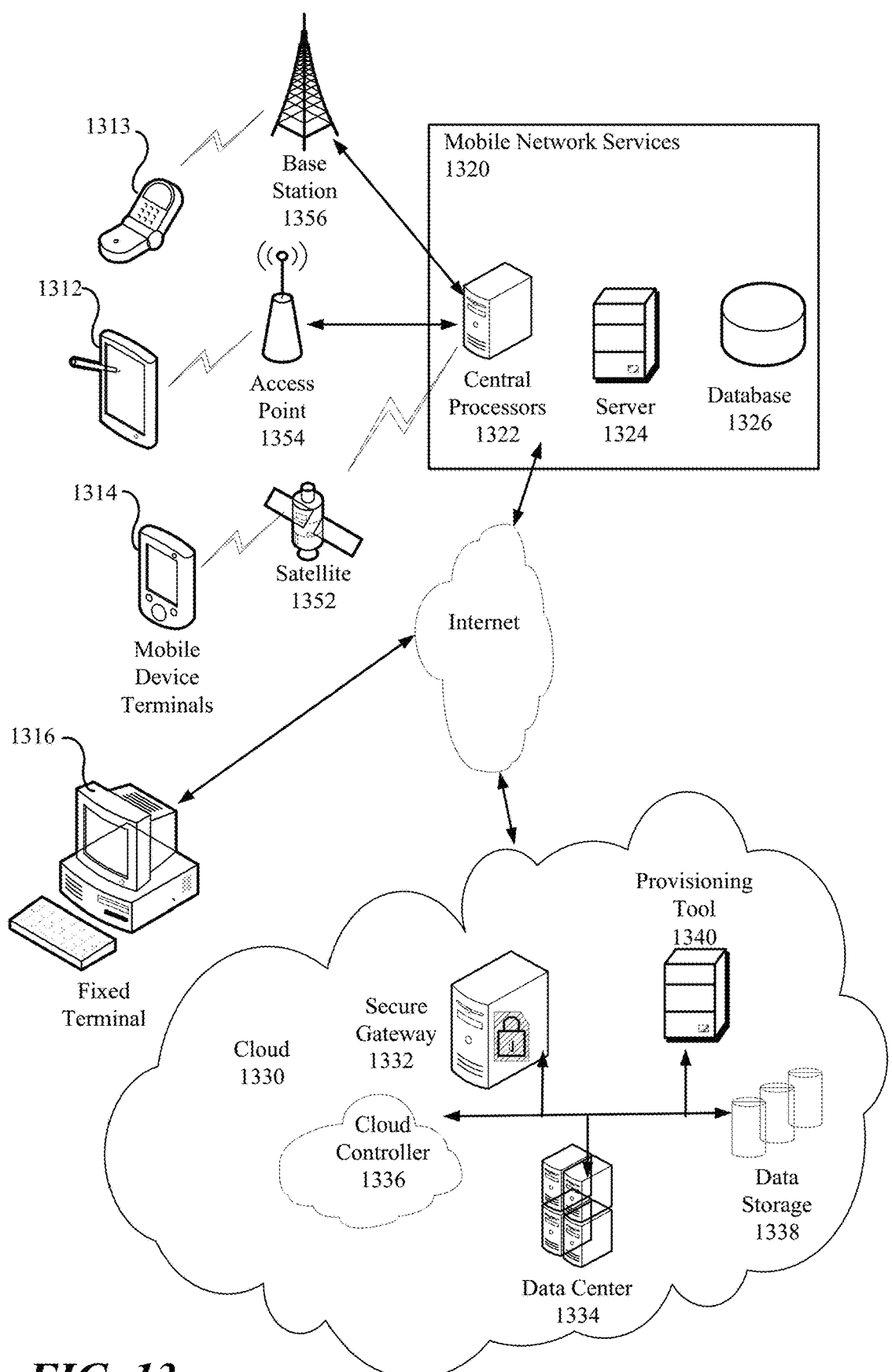
FIG. 13 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 13, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A multi-level switched capacitor boost inverter, comprising:
   a two-switched capacitor circuit including a first capacitor, a second capacitor and a first plurality of switches ($S_L$):
   a first one-switched capacitor circuit including a third capacitor and a second plurality of switches ($S_R$):
   a source circuit including a DC voltage source and a third plurality of switches ($S_S$), the source circuit connected in series between the two-switched capacitor circuit and the first one-switched capacitor circuit;
   a pair of load terminals; and
   a control circuit operatively connected to the pair of load terminals, the first, second and third capacitors and the first, second and third plurality of switches, wherein the control circuit is configured to generate drive signals to selectively operate the first, second and third plurality of switches to balance the first and second capacitors and provide an output voltage across the pair of load terminals.

2. The multi-level switched capacitor boost inverter of claim 1, wherein the first plurality of switches ($S_L$) includes
   first, second, third, fourth and fifth unidirectional semiconductor switches; and
   a first bi-directional semiconductor switch.

3. The multi-level switched capacitor boost inverter of claim 2, comprising:
   wherein the second plurality of switches ($S_R$) includes eighth, ninth, tenth and eleventh unidirectional semiconductor switches.

4. The multi-level switched capacitor boost inverter of claim 3, comprising:
   wherein the third plurality of switches ($S_S$), includes thirteenth, fourteenth, fifteenth and sixteenth unidirectional switches.

5. The multi-level switched capacitor boost inverter of claim 4, wherein each unidirectional semiconductor switch of the first, second and third plurality of switches comprises:
   a transistor having an emitter, a collector and a gate; and
   a diode connected antiparallel to the transistor.

6. The multi-level switched capacitor boost inverter of claim 5, wherein the first plurality of switches ($S_L$), further comprises:
   the first unidirectional switch having a first emitter, a first collector and a first gate;
   the second unidirectional switch having a second emitter, a second collector and a second gate;
   the third unidirectional switch having a third emitter, a third collector and a third gate;
   the fourth unidirectional switch having a fourth emitter, a fourth collector and a fourth gate;
   the fifth unidirectional switch having a fifth emitter, a fifth collector and a fifth gate;
   the first bi-directional semiconductor switch including a sixth unidirectional switch having a sixth emitter, a sixth collector and a sixth gate and a seventh unidirectional switch having a seventh emitter, a seventh collector and a seventh gate, wherein the emitter of the sixth unidirectional switch is connected to the emitter of the seventh unidirectional switch;
   wherein the first capacitor has a first positive and a first negative terminal; and
   wherein the second capacitor has a second positive and a second negative terminal.

7. The multi-level switched capacitor boost inverter of claim 6,
   wherein the collector of the first unidirectional switch is connected to the emitter of the second unidirectional switch;
   wherein the emitter of the first unidirectional switch is connected to the collector of the third unidirectional switch;
   wherein the collector of the second unidirectional switch is connected to the positive terminal of the first capacitor;
   wherein the emitter of the third unidirectional switch is connected to the negative terminal of the second capacitor;
   wherein the negative terminal of the first capacitor is connected to the positive terminal of the second capacitor;
   wherein the collector of the fourth unidirectional switch is connected to the positive terminal of the first capacitor;
   wherein the emitter of the fifth unidirectional switch is connected to the negative terminal of the second capacitor;
   wherein the collector of the sixth unidirectional switch is connected to the emitter of the fourth unidirectional switch and to the collector of the fifth unidirectional switch; and
   wherein the collector of the seventh unidirectional switch is connected to the negative terminal of the first capacitor.

8. The multi-level switched capacitor boost inverter of claim 7, wherein the second plurality of switches ($S_R$), comprises:
   the eighth unidirectional switch having an eighth emitter, an eighth collector and an eighth gate;
   the ninth unidirectional switch having a ninth emitter, a ninth collector and a ninth gate;
   the tenth unidirectional switch having a tenth emitter, a tenth collector and a tenth gate;
   the eleventh unidirectional switch having an eleventh emitter, an eleventh collector and an eleventh gate; and
   wherein the third capacitor has a third positive and a third negative terminal.

9. The multi-level switched capacitor boost inverter of claim 8,
wherein the collector of the eighth unidirectional switch is connected to the emitter of the ninth unidirectional switch;
wherein the emitter of the eighth unidirectional switch is connected to the collector of the tenth unidirectional switch;
wherein the emitter of the eleventh unidirectional switch is connected to the collector of the twelfth unidirectional switch;
wherein the collector of the ninth unidirectional switch and the collector of the eleventh unidirectional switch are connected to the positive terminal of the third capacitor; and
wherein the emitter of the tenth unidirectional switch and the emitter of the twelfth unidirectional switch are connected to the negative terminal of the capacitor.

10. The multi-level switched capacitor boost inverter of claim 9, wherein the third plurality of switches ($S_S$), further comprises:
the thirteenth unidirectional switch having a thirteenth emitter, a thirteenth collector and a thirteenth gate;
the fourteenth unidirectional switch having a fourteenth emitter, a fourteenth collector and a fourteenth gate;
the fifteenth unidirectional switch having a fifteenth emitter, a fifteenth collector and a fifteenth gate;
the sixteenth unidirectional switch having a sixteenth emitter, a sixteenth collector and a sixteenth gate;
wherein the DC voltage source has a positive connector and a negative connector; and
wherein the load terminals include a first load terminal and a second load terminal.

11. The multi-level switched capacitor boost inverter of claim 10,
wherein the collector of the thirteenth unidirectional switch and the collector of the fourteenth unidirectional switch are connected to the positive connector of the DC voltage source;
wherein the emitter of the fifteenth unidirectional switch and the emitter of the sixteenth unidirectional switch are connected to the negative connector of the DC voltage source;
wherein the emitter of the thirteenth unidirectional switch is connected to the emitter of the second unidirectional switch;
wherein the collector of the fifteenth unidirectional switch is connected to the collector of the third unidirectional switch;
wherein the emitter of the fourteenth unidirectional switch is connected to the emitter of the ninth unidirectional switch; and
wherein the collector of the sixteenth unidirectional switch is connected to the collector of the tenth unidirectional switch.

12. The multi-level switched capacitor boost inverter of claim 11,
wherein the first load terminal is connected to the collector of the sixth unidirectional switch; and
wherein the second load terminal is connected to the collector of the twelfth unidirectional switch.

13. The multi-level switched capacitor boost inverter of claim 12,
wherein the control circuit is operatively connected to the gates of the first, second and third plurality of switches; and
wherein the drive signals are configured to selectively provide gate pulses to the gates of the first, second and third plurality of switches to generate thirteen voltage levels at the first and second load terminals.

14. The multi-level switched capacitor boost inverter of claim 13, further comprising:
an additional one-switched capacitor circuit connected in series with the first one-switched capacitor circuit, the additional one-switched capacitor circuit including an additional five unidirectional switches and an additional capacitor;
wherein the first load terminal is connected to the collector of the sixth unidirectional switch; and
wherein the second load terminal is connected in parallel with the additional capacitor.

15. The multi-level switched capacitor boost inverter of claim 14,
wherein the control circuit is operatively connected to the gates of the additional switches; and
wherein the drive signals are configured to selectively provide gate pulses to the gates of the first, second and third plurality of switches and the additional switches to generate seventeen voltage levels at the first and second load terminals.

16. A method of operating a multi-level switched capacitor boost inverter, comprising:
generating, by a control circuit, a plurality of gate pulses using level-shifted pulse width modulation (LS-PWM);
applying the gate pulses to a plurality of unidirectional semiconductor switches of the multi-level switched capacitor boost inverter;
charging, by a DC voltage source, a pair of series connected capacitors of a two-switched capacitor circuit of the multi-level switched capacitor boost inverter;
adjusting the gate pulses to balance each of the series connected capacitors to have a same voltage magnitude;
charging, by the DC voltage source of a source circuit of multi-level switched capacitor boost inverter, a first output capacitor of a first one-switched capacitor circuit of the multi-level switched capacitor boost inverter; and
generating a thirteen-level output voltage across a pair of load terminals equal to the charge on the first output capacitor.

17. The method of operating a multi-level switched capacitor boost inverter of claim 16, further comprising:
charging, by the DC voltage source of a source circuit of multi-level switched capacitor boost inverter, a second output capacitor of a second one-switched capacitor circuit of the multi-level switched capacitor boost inverter; and
generating a seventeen-level output voltage across a pair of load terminals equal to the charge on the second output capacitor.

18. A method of providing a multi-level switched capacitor boost inverter, comprising:
connecting a two-switched capacitor circuit, a source circuit and at least one first one-switched capacitor circuit in series;
connecting a load across the two-switched capacitor circuit and the at least one first one-switched capacitor circuit;
operatively connecting a control circuit to each gate of a plurality of switches of the two-switched capacitor circuit, the source circuit and the at least one first one-switched capacitor circuit, the capacitors and across the load;

generating, by the control circuit, a plurality of gate pulses using level-shifted pulse width modulation (LS-PWM);

applying the gate pulses to the plurality of switches;

charging, with a DC voltage source, a pair of series connected capacitors of the two-switched capacitor circuit;

adjusting the gate pulses to balance each of the series connected capacitors to have a same voltage magnitude;

charging, by the DC voltage source of a source circuit of the multi-level switched capacitor boost inverter, an output capacitor of the one-switched capacitor circuit; and generating an output voltage across the load equal to the charge on the output capacitor, wherein the output voltage has thirteen voltage levels and a gain equal to three.

19. The method of claim 18, further comprising:

determining a number of voltage levels, N, to be provided to the load by the switched capacitor multi-level boost inverter;

determining a number of switches, $N_{SW}$, needed to provide the number of voltage levels by:

$$N_{SW} = \frac{1}{4}(5N-1);$$

determining a number of capacitors, $N_{CAP}$, needed to provide the number of voltage levels by:

$$N_{CAP} = \frac{1}{4}(N-1);\text{ and}$$

determining a voltage gain, G, across the load by:

$$G = \frac{1}{4}(N-1).$$

20. The method of claim 19, further comprising:

connecting at least one additional one-switched capacitor circuit in series with the first one-switched capacitor circuit;

connecting the load across the two-switched capacitor circuit and the at least one additional one-switched capacitor circuit;

operatively connecting the control circuit to provide gate pulses to the at least one additional one-switched capacitor circuit;

charging, by the DC voltage source, an additional output capacitor of the at least one additional one-switched capacitor circuit; and generating an output voltage across the load equal to the charge on the additional output capacitor, wherein the output voltage has seventeen levels and a gain equal to four.

* * * * *